US012716908B2

(12) United States Patent
Bowers, III

(10) Patent No.: US 12,716,908 B2
(45) Date of Patent: Aug. 25, 2026

(54) METHODS AND APPARATUS TO GENERATE A PULSE WAVEFORM FROM A TACHOMETER SIGNAL

(71) Applicant: Computational Systems Inc., Knoxville, TN (US)

(72) Inventor: Stewart Vandiver Bowers, III, Knoxville, TN (US)

(73) Assignee: Computational Systems Inc., Knoxville, TN (US)

(*) Notice: Subject to any disclaimer, the term of this patent is extended or adjusted under 35 U.S.C. 154(b) by 393 days.

(21) Appl. No.: 18/479,443

(22) Filed: Oct. 2, 2023

(65) Prior Publication Data

US 2025/0110148 A1 Apr. 3, 2025

(51) Int. Cl.
*G01P 3/00* (2006.01)
*G01M 13/04* (2019.01)
(Continued)

(52) U.S. Cl.
CPC ............... *G01P 3/00* (2013.01); *G01M 13/04* (2013.01); *G01P 1/06* (2013.01); *G01M 15/046* (2013.01); *G01P 3/481* (2013.01); *G01P 3/489* (2013.01)

(58) Field of Classification Search
CPC .... G01P 3/00; G01P 1/06; G01P 3/481; G01P 3/489; G01M 13/04; G01M 15/046
See application file for complete search history.

(56) References Cited

U.S. PATENT DOCUMENTS

| | | | |
|---|---|---|---|
| 10,352,956 B2 | 7/2019 | Bowers, III | |
| 2005/0231191 A1 | 10/2005 | Tsuji | |
| 2021/0124345 A1* | 4/2021 | Hayzen | G06Q 10/20 |

FOREIGN PATENT DOCUMENTS

| | | |
|---|---|---|
| JP | 2004183565 A | 7/2004 |

OTHER PUBLICATIONS

International Search Authority, "International Search Report," issued Nov. 18, 2024 in connection with International Patent Application No. PCT/US2024/047751, 4 pages.

(Continued)

*Primary Examiner* — Christian T Bryant
(74) *Attorney, Agent, or Firm* — Hanley, Flight & Zimmerman, LLC

(57) ABSTRACT

Systems, apparatus, articles of manufacture, and methods are disclosed to generate a pulse waveform from a tachometer signal. An example apparatus disclosed herein includes machine readable instructions, and programmable circuitry to at least one of instantiate or execute the machine readable instructions to access a signal output by a tachometer monitoring machinery having a rotating component, determine, based on a first property of the signal, a first pulse threshold candidate for the signal, determine whether the first pulse threshold candidate satisfies a testing criterion, generate a second pulse threshold candidate after determining the first pulse threshold candidate does not satisfy the testing criterion, the second pulse threshold candidate based on (1) a second property of the signal or (2) a modification to the first pulse threshold candidate, determine whether the second pulse threshold candidate satisfies the testing criterion, and generate a pulse waveform based on the second pulse threshold candidate after determining the second pulse threshold candidate satisfies the testing criterion.

17 Claims, 11 Drawing Sheets

(51) Int. Cl.

| | |
|---|---|
| ***G01M 15/04*** | (2006.01) |
| ***G01P 1/00*** | (2006.01) |
| ***G01P 3/481*** | (2006.01) |
| ***G01P 3/489*** | (2006.01) |

(56) References Cited

OTHER PUBLICATIONS

International Search Authority, "Written Opinion," issued Nov. 18, 2024 in connection with International Patent Application No. PCT/US2024/047751, 9 pages.

* cited by examiner

METHODS AND APPARATUS TO GENERATE A PULSE WAVEFORM FROM A TACHOMETER SIGNAL

FIELD OF THE DISCLOSURE

This disclosure relates generally to signal processing and, more particularly, to methods and apparatus to generate a pulse waveform from a tachometer signal.

BACKGROUND

Tachometers can be used to measure the rotational speed of devices, such as motors, centrifuges, shafts, disks, turbomachinery, and gears. The rotational characteristics of such devices can be used to determine the condition of such rotating devices. Some tachometers require contact with the rotating portion of the devices. Other tachometers do not require contact with rotational devices. Examples of non-contact tachometers include optical tachometers, laser tachometers, inductive tachometers, and magnetic tachometers. These non-contact tachometers detect or sense a specific marking or feature that has been applied to the rotating device.

SUMMARY SECTION

Examples disclosed herein enable the generation of pulse waveforms and speed determination of rotating components without distinguishable markers or other indicia. Examples disclosed herein identify a suitable amplitude threshold (also referred to herein as a pulse threshold) for tachometer signals to generate a pulse waveform. Examples disclosed herein generate one or more pulse threshold candidates based on properties of the received tachometer signal and determine if the generated pulse threshold candidate satisfies one or more testing criteria. Examples disclosed herein iteratively generate and/or modify pulse threshold candidates until a suitable pulse threshold is identified based on the testing criteria. Examples disclosed herein enable a technician to quickly and accurately determine the speed of rotating machinery that does not have a distinguishable marker via a contactless tachometer.

An example apparatus disclosed herein includes machine readable instructions, and programmable circuitry to at least one of instantiate or execute the machine readable instructions to access a signal output by a tachometer monitoring machinery having a rotating component, determine, based on a first property of the signal, a first pulse threshold candidate for the signal, determine whether the first pulse threshold candidate satisfies a testing criterion, generate a second pulse threshold candidate after determining the first pulse threshold candidate does not satisfy the testing criterion, the second pulse threshold candidate based on (1) a second property of the signal or (2) a modification to the first pulse threshold candidate, determine whether the second pulse threshold candidate satisfies the testing criterion, and generate a pulse waveform based on the second pulse threshold candidate after determining the second pulse threshold candidate satisfies the testing criterion.

A non-transitory machine readable storage medium disclosed herein includes comprising instructions to cause programmable circuitry to at least access a signal output by a tachometer monitoring machinery having a rotating component, determine, based on a first property of the signal, a first pulse threshold candidate for the signal, determine whether the first pulse threshold candidate satisfies a testing criterion, generate a second pulse threshold candidate after determining the first pulse threshold candidate does not satisfy the testing criterion, the second pulse threshold candidate based on (1) a second property of the signal or (2) a modification to the first pulse threshold candidate, determine whether the second pulse threshold candidate satisfies the testing criterion, and generate a pulse waveform based on the second pulse threshold candidate after determining the second pulse threshold candidate satisfies the testing criterion.

An example method disclosed herein includes accessing a signal output by a tachometer monitoring machinery having a rotating component, determining, based on a first property of the signal, a first pulse threshold candidate for the signal, determining whether the first pulse threshold candidate satisfies a testing criterion, generating a second pulse threshold candidate after determining the first pulse threshold candidate does not satisfy the testing criterion, the second pulse threshold candidate based on (1) a second property of the signal or (2) a modification to the first pulse threshold candidate, determining whether the second pulse threshold candidate satisfies the testing criterion, and generating a pulse waveform based on the second pulse threshold candidate after determining the second pulse threshold candidate satisfies the testing criterion.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
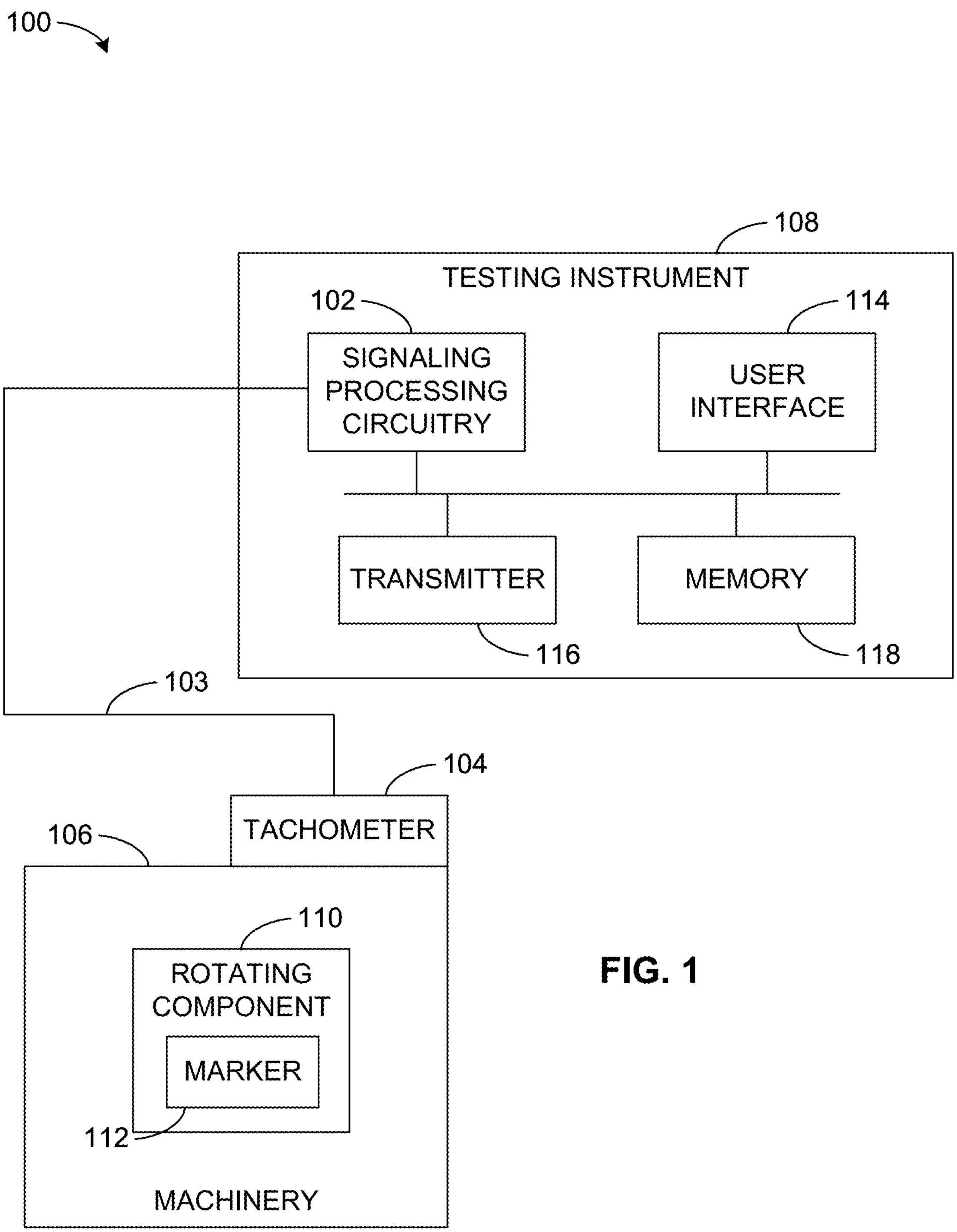
FIG. 1 is a block diagram of an example environment in which example signal processing circuitry operates to process a signal output by an example tachometer.

Monitoring the vibration of rotating machines facilitates the continued operation and maintenance of such machinery. Precise measurements of the rotating speed of machinery are needed to determine the natural frequencies and excitations of the machinery. Such precise speed measurements are also used to perform order tracking (e.g., order analysis, etc.), synchronous time averaging, single channel phasing, and the generation of Bode plots. Portable tachometers can be used by technicians to accurately and precisely measure the rotational speed of machinery. For example, many facilities, such as manufacturing plants, factories, refineries, etc. have multiple motor-driven pumps throughout the facility. It is important to routinely check the motors to ensure they are operating normally and not suffering from any potential malfunction (e.g., worn bearings). Therefore, technicians routinely check the speed of a motor-driven pump by temporarily connecting a tachometer to the motor. In some instances, the tachometer outputs signals to an electronic device (e.g., a tablet, a testing instrument, etc.) carried by the technician. The signals are analyzed by the electronic device to determine the speed and/or other parameters of the motor. These parameters can be used to determine the operational state of the motor and/or for vibrational analysis.

Many tachometers track (e.g., optically, electromagnetically, via a laser, etc.) a specific, distinguishable marker (e.g., a reflective line, a magnet, etc.) applied on the outer diameter of the rotating machinery and output a signal corresponding to the rotation thereof. Because the marker is disposed at a single location on the outer diameter of the rotating component, the tachometer can measure the rotation of the component based on the repeating cycle of the marker. However, many rotating components do not include accessible markers, and/or the original markers may be obstructed (e.g., by grease, by grim, by dirt, etc.) or worn away. In the absence of a definitive marker, many tachometers generate a signal corresponding to the detection of surface imperfections and/or damage (e.g., knicks, buffs, scratches, etc.) on the rotational component. Such signals have significantly more noise and less amplitude variation than signals generated in the presence of the marker. Accordingly, many prior tachometer signal processing techniques are not able to identify rotations of the rotating component and/or determine the speed of such rotating components without a marker.

Disclosed herein are example systems, apparatus, and methods that enable the generation of pulse waveforms and speed determination of rotating components without the presence of a distinguishable marker by identifying a suitable amplitude threshold to generate a pulse waveform for the signal. Examples disclosed herein analyze a tachometer signal to determine one or more pulse threshold candidates based on properties of the received signal. Examples disclosed herein assess the suitability of the generated pulse threshold candidates based on one or more testing criteria, such as the stability and the component speed associated with the generated waveform. Examples disclosed herein modify generated pulse threshold candidates until a suitable pulse threshold candidate is identified. Examples disclosed herein enable the analysis of rotating components via a tachometer without a clear or distinguishable marker on the target rotating component. Examples disclosed herein enable a technician to quickly and accurately determine the speed of rotating machinery that does not have a marker and/or having a mark is not distinguishable (e.g., worn away, dulled, dirty, obstructed, etc.) via a contactless tachometer.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

FIG. 1 is a block diagram of an example environment 100 in which an example signal processing circuitry 102 accesses and processes an example signal 103 output by an example tachometer 104. In the illustrated example of FIG. 1, the environment 100 includes example machinery 106 and an example apparatus 108, referred to herein as a testing instrument 108. In the illustrated example of FIG. 1, the machinery 106 includes an example rotating component 110 having an example marker 112. In the illustrated example of FIG. 1, the testing instrument 108 includes the signal processing circuitry 102, an example user interface 114, an example transmitter 116, and example memory 118.

The example tachometer 104 is a sensor that monitors the machinery 106 and measures the rotation of the rotating component 110. The tachometer 104 is a contactless tachometer that outputs the signal 103, which corresponds to the rotation of the rotating component 110. In some examples, the signal 103 is output by the tachometer 104 as an analog signal. The tachometer 104 can be implemented by any suitable contactless tachometer, including an optical tachometer, a laser tachometer, an inductive tachometer, a magnetic tachometer, etc. In some examples, the tachometer 104 is a component of the testing instrument 108. In other examples, the tachometer 104 is a separate component and/or device in communication with the testing instrument 108 (e.g., via a wired connection, via a wireless connection, etc.). In the illustrated example of FIG. 1, the tachometer 104 is monitoring the machinery 106 and the rotating component 110.

The machinery 106 is a mechanical device that includes the rotating component 110. For example, the machinery 106 can be an electric motor, turbomachinery (e.g., a gas turbine, a propeller, a pump, a steam turbine, etc.), a vehicle (e.g., a car, a train, a motorcycle, an aircraft, etc.), manufacturing machinery (e.g., a mill, a lathe, a grinder, etc.), and/or any other machinery 106 that includes one or more rotating components. The rotating component 110 is a rotational element associated with the machinery 106. For example, the rotating component 110 can be a shaft, an axle, a disk, a centrifuge, a gear, and/or any other mechanical device that rotates during operation. In some examples, the rotating component 110 has a nominal rotational speed (e.g., an expected rotational speed, a standard rotational speed, etc.) that is used to calibrate the signal processing circuitry 102.

The marker 112 is distinctive indicia coupled to the outer diameter of the rotating component 110 that facilitates the measurement of the rotational characteristics of the rotating component 110 by the tachometer 104. For example, if the tachometer 104 is an optical tachometer, the marker 112 can be a visible reflective sticker/tape, and/or a keyway in the rotating component 110. As another example, if the tachometer 104 is a magnetic tachometer (e.g., a Hall-effect tachometer, etc.), the marker 112 can be a permanent magnet, a ferrous material, and/or an electromagnet. If the marker 112 is distinguishable (e.g., clearly discernable, etc.) on the rotating component 110, the tachometer 104 can detect the marker 112 and generate the signal 103 such that the signal 103 clearly indicates each rotation of the marker 112 on the rotating component 110. An example representation of the signal 103 generated by the tachometer 104 with a clear marker is described below in conjunction with FIG. 2A.

In other examples, the marker 112 is absent, unknown to an operator of the testing instrument 108, and/or obstructed (e.g., from dirt, from oil, etc.). In some such examples, the tachometer 104 outputs a signal based on natural surface variations in the outer diameter of the rotating component 110 and/or nicks, scratches, and scuffing of the rotating component 110. However, such features are often less distinctive than the marker 112 and result in the signal 103 including comparatively less peak-to-peak amplitude and comparatively greater noise (e.g., compared to a signal generated with a marker 112, etc.). An example representation of the signal 103 generated by the tachometer 104 in the absence of a clear marker is described below in conjunction with FIG. 2B.

The testing instrument 108 is a monitoring device that is used to monitor the machinery 106 and/or the rotating component 110. In some examples, the testing instrument 108 and the tachometer 104 is a unitary device. In other examples, the testing instrument 108 and the tachometer 104 are separate devices. In some examples, the testing instrument 108 is a portable electronic device (e.g., a tablet, a laptop computer, a phone, etc.) that is carried by a technician monitoring the machinery 106. In other examples, the testing instrument 108 may be a stationary or fixed instrument, such as a computer or server in a control room of a facility. Additionally or alternatively, the testing instrument 108 is a component of a controller (e.g., an electronic controller unit (ECU), etc.) of the machinery 106.

The user interface 114 presents information to a user (e.g., a technician) of the testing instrument 108. For example, the user interface 114 can output information relating to the signal 103, the rotational speed of the rotating component 110, and/or a pulse waveform generated by the signal processing circuitry 102 via processing the signal 103. The user interface 114 can include one or more graphical user interfaces (e.g., a segmented display, a dot matrix display, etc.), one or more audio interfaces (e.g., a speaker, etc.), and/or one or more tactile interfaces (e.g., a vibration pack, etc.). The transmitter 116 enables the testing instrument 108 to communicate with external devices. For example, the transmitter 116 can interface with the tachometer 104 to receive the signal 103. In other examples, the transmitter 116 can interface with an internal computer device (e.g., a server, a mobile device, a controller of the machinery 106, etc.). In some examples, the transmitter 116 can receive instructions (e.g., machine readable instructions, etc.) for the operation of the signal processing circuitry 102.

The memory 118 stores information and/or applications associated with the testing instrument 108 and/or the signal processing circuitry 102. In some examples, the memory 118 can include a database. In some examples, the memory 118 can store machine readable instructions for the signal processing circuitry 102. In some examples, the memory 118 can store parameters related to the operation of the signal processing circuitry 102 (e.g., properties of the signal 103, pulse threshold candidates, the nominal speed of the rotating component 110, a suitable pulse threshold candidate, etc.). In some examples, the memory 118 can be implemented by the local memory 713 of FIG. 7, the volatile memory 714 of FIG. 7, the non-volatile memory 716 of FIG. 7, and/or the mass storage device 728 of FIG. 7. In the illustrated example of FIG. 1, the signal processing circuitry 102, the user interface 114, the transmitter 116, and the memory 118 are components of the testing instrument 108. In other examples, some or all of the signal processing circuitry 102, the user interface 114, the transmitter 116, and/or the memory 118 can be separate and/or discrete devices in communication with the testing instrument 108.

During operation, the signal processing circuitry 102 uses the signal 103 output by the tachometer 104 to output a pulse waveform corresponding to the rotation of the rotating component 110. The signal processing circuitry 102 can sample a portion of the signal 103 over a sample period (e.g., 1 second, 5 seconds, etc.) at a sample rate (e.g., 48,000 samples per minute, etc.). In some examples, the sample rate and/or the length of the sample period are based on the nominal speed of the rotating component 110. In some such examples, the signal processing circuitry 102 can use the generated pulse waveform to determine the rotational speed of the rotating component 110. In some examples, if the marker 112 is clearly discernable in the signal 103, the signal processing circuitry 102 can use the presence of the marker to generate a pulse waveform and determine the rotational speed of the rotating component 110.

In other examples, if the marker 112 is not clearly discernable in the signal 103 output by the tachometer 104 (e.g., the marker 112 is absent, the location of the marker 112 is unknown to an operator of the testing instrument 108, the marker 112 is obstructed, etc.), the signal processing circuitry 102 can generate a pulse waveform by determining a suitable pulse threshold to apply to the signal 103. In some examples, the signal processing circuitry 102 can preprocess the signal 103 by filtering the signal 103 via a low pass filter (LPF) and/or removing the direct current (DC) component of the signal 103. In some examples, the signal processing circuitry 102 can analyze the signal properties (e.g., extrema, averages, standard deviation, etc.) to identify one or more pulse threshold candidates. In some such examples, the signal processing circuitry 102 can evaluate and/or modify (e.g., adjust, change, etc.) the pulse threshold candidates until a suitable pulse threshold candidate is identified. An example implementation of the signal processing circuitry 102 is described below in conjunction with FIG. 3. Example operations to find a suitable pulse threshold, generate a pulse waveform, and identify the speed of the rotational component 110 are described below in conjunction with FIGS. 4-6.

Figure 2A:
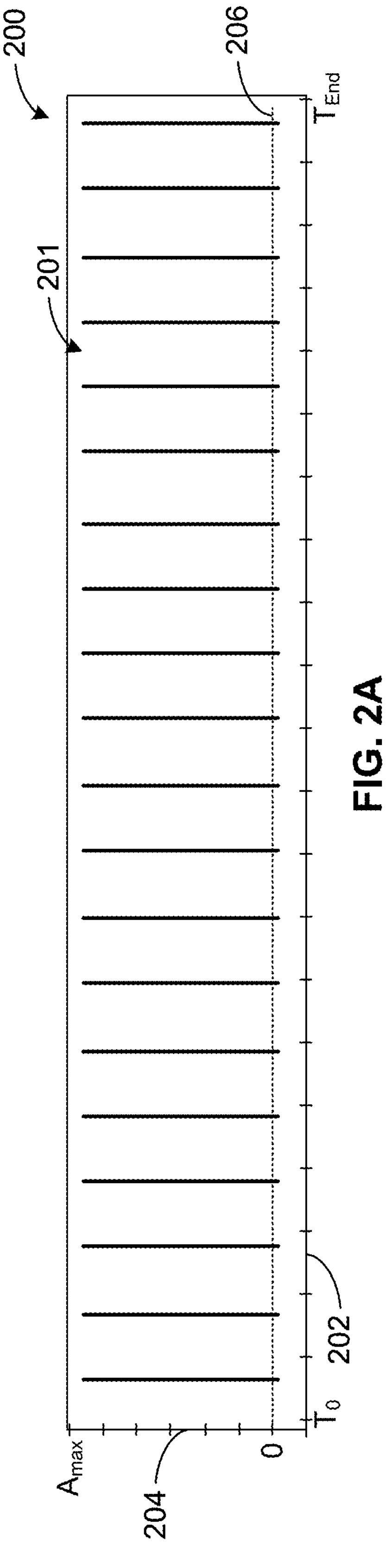
FIG. 2A is an example signal output by the example tachometer of FIG. 1 in connection with a rotating component having a distinguishable marker.

FIG. 2A is an example first graph 200 of an example first signal 201 that can be output by the tachometer 104 of FIG. 1. In the illustrated example of FIG. 2A, the graph 202 has an example x-axis 202, an example y-axis 204, and an example signal reference or ground 206. The example first signal 201 corresponds to the signal 103 when the marker 112 of FIG. 1 is clearly visible or identifiable to the tachometer 104 of FIG. 1. In the illustrated example of FIG. 2A, the first signal 201 has been preprocessed by the signal processing circuitry 102 to filter the first signal 201 with a low pass filter and/or remove the DC component of the first signal 201.

The x-axis 202 measures the independent variable time. In the illustrated example of FIG. 2A, a first time, $T_0$, and an example second time, $T_{End}$ (e.g., an end time, etc.) are marked on the x-axis 202. In some examples, the elapsed time between $T_0$ and $T_{End}$ is the sampling period of the first signal 201 by the signal processing circuitry 102 (e.g., by the tachometer interface circuitry 304, etc.). The x-axis 202 can have any suitable units of measurement (e.g., milliseconds, seconds, sample number, etc.). The first y-axis 204 measures the amplitude of the first signal 201. The amplitude of the first signal 201 extends between less than 0 (e.g., the ground 206, etc.) and $A_{max}$. It should be appreciated that the value of $A_{max}$ can vary based on the tachometer 104, the clarity of the marker 112, and the preprocessing of the first signal 201. In the illustrated example of FIG. 2A, as the rotating component 110 rotates, the distinctiveness of the marker 112 (e.g., the visual reflectivity, etc.) disposed thereon is detected by the tachometer 104 and illustrated as an impulse (e.g., a substantially vertical spike on the first graph 200, etc.), etc. That is, the distinctiveness of the marker 112 relative to the other surface features of the rotating component 110 causes the portion of the first signal 201 corresponding to the detection of the marker 112 to be readily identifiable on the first graph 200. As such, the presence of the marker 112 enables individual rotations of the rotating component 110 to be identified based on impulses in the first signal 201.

Figure 2B:
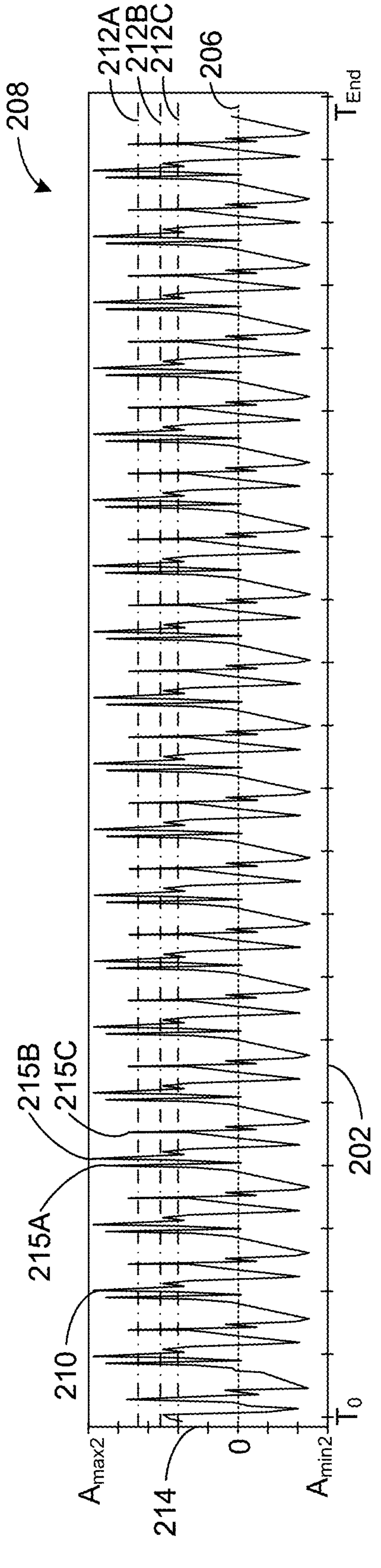
FIG. 2B is an example signal output by the example tachometer of FIG. 1 in connection with a rotating component without a distinguishable marker and example pulse threshold candidates generated by the example signal processing circuitry of FIG. 1.

FIG. 2B is an example second graph 208 of an example second signal 210. FIG. 2B also shows an example first pulse threshold candidate 212A, an example second pulse threshold candidate 212B, and an example third pulse threshold candidate 212C, which can be generated by the example signal processing circuitry 102, disclosed in further detail herein. In the illustrated example of FIG. 2B, the second graph 210 has the x-axis 202 of FIG. 2A, an example second y-axis 214, and the example ground 206 of FIG. 2A. Like the first signal 201 of FIG. 2A, the second signal 210 has been preprocessed by the signal processing circuitry 102 (e.g., by the preprocessor circuitry 306 of FIG. 3, etc.) via a low pass filter and/or to remove the DC component of the second signal 210. Unlike the first signal 201 of FIG. 2A, the second signal 210 was generated by the tachometer 104 in the absence of a clear marker.

The second y-axis 214 of FIG. 2B is similar to the first y-axis 204 of FIG. 2A, except that the second y-axis 214 extends between $A_{min2}$ and $A_{max2}$. Because the marker 112 is absent, the variations in the second signal 210 output of the tachometer 104 are due to surface variations of the outer diameter of the rotating component 110 (e.g., knicks, scratches, grime, scuffs, manufacturing variations, etc.). In some examples, the comparatively reduced distinctiveness of various portions of the rotating component 110 causes the magnitude of $A_{max2}$ of FIG. 2B to be less than $A_{max}$ of FIG.

2A. Accordingly, the second signal 210 has comparatively less peak-to-peak amplitude variation and comparatively more noise than the first signal 201.

In the illustrated example of FIG. 2B, the second signal 210 includes an example first local maximum 215A, an example second local maximum 215B, and an example third local maximum 215C. Unlike signal 201 of FIG. 2A, the local maxima 215A, 215B, 215C do not correspond to individual pulses of the rotating component 110 of FIG. 1. In particular, each of the local maxima does not correspond to an individual rotation of the rotating component 110, unlike the impulses of the signal 201 of FIG. 2A.

The signal processing circuitry 102 generates the pulse threshold candidates 212A, 212B, 212C based on the properties of the second signal 210. For example, the first pulse threshold candidate 212A is the sum of the standard deviation of the second signal 210 and the median value of the second signal 210, the second pulse threshold candidate 212B is the standard deviation of the second signal 210, and the third pulse threshold candidate 212C is the median value of the second signal 210. In some examples, because a majority of the second signal 210 is above the ground 206 (e.g., positive, greater than zero, etc.), the signal processing circuitry 102 generates the pulse threshold candidates 212A, 212B, 212C as positive values on the second y-axis 214. In other examples, if the majority of the signal is below the ground 206 (e.g., negative, less than zero, etc.), the signal processing circuitry 102 can generate the pulse threshold candidates 212A, 212B, 212C as negative.

In some examples, the signal processing circuitry 102 can modify (e.g., adjust, etc.) one or more the pulse threshold candidates until a suitable pulse threshold is identified. For example, during operation, the signal processing circuitry 102 can assess and/or modify some or all of the pulse threshold candidates 212A, 212B, 212C to find a suitable pulse threshold candidate to generate a stable pulse waveform. The signal processing circuitry 102 can assess the pulse threshold candidates via one or more testing criteria (e.g., a pulse presence testing criterion, a speed testing criterion, a pulse quantity testing criterion, a stability testing criterion, etc.). Example testing criteria are disclosed in further detail in conjunction with FIG. 3. The signal processing circuitry 102 can modify one or more of the pulse threshold candidates 212A, 212B, 212C by increasing and/or decreasing the value of the pulse threshold candidate on the second y-axis 214. An example suitable pulse threshold is described below in conjunction with FIG. 2C. Example operations to modify one or more of the pulse threshold candidates are described below in conjunction with FIGS. 5 and 6.

Figure 2C:
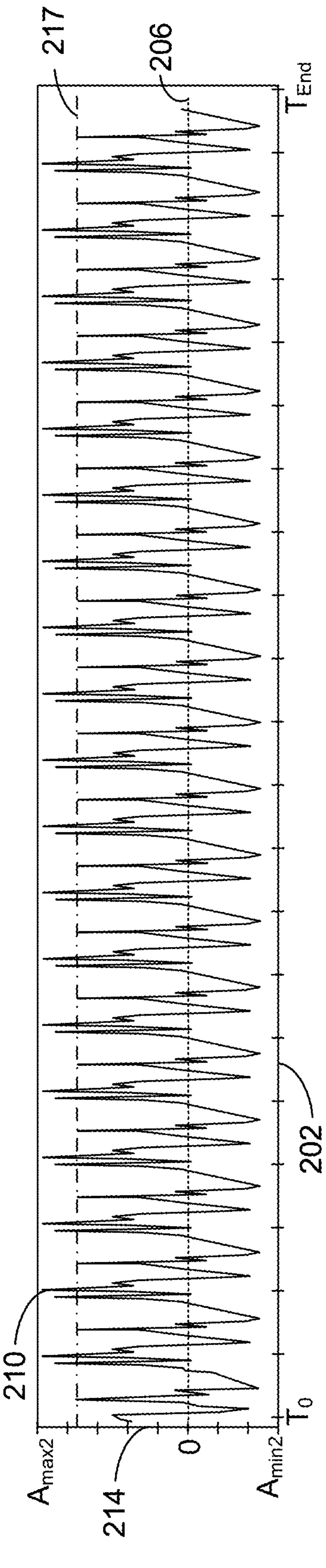
FIG. 2C is an example signal output by the example tachometer of FIG. 1 in connection with a rotating component without a distinguishable marker and an identified pulse threshold generated by the example signal processing circuitry of FIG. 1.

FIG. 2C is an example third graph 216 of the second signal 210 of FIG. 2B that can be output by the tachometer 104 of FIG. 1. In the illustrated example of FIG. 2C, the third graph 216 includes the example x-axis 202 of FIGS. 2A and 2B and the example y-axis of FIG. 2B. In the illustrated example of FIG. 2C, the second graph 208 includes an example pulse threshold 217.

The pulse threshold 217 is an amplitude value that can be used to generate a pules waveform by the signal processing circuitry 102. In some examples, the pulse threshold 217 can be determined as suitable to generate a pulse waveform for the signal 210 by assessing and/or modifying one of the pulse threshold candidates 212A, 212B, 212C. For example, the signal processing circuitry 102 can generate a pulse of a fixed (e.g., preset, etc.) duration whenever the amplitude of the signal 103 exceeds the pulse threshold 217. An example pulse waveform generated by the signal processing circuitry via the pulse threshold 217 is described below in conjunction with FIG. 2D.

Figure 2D:
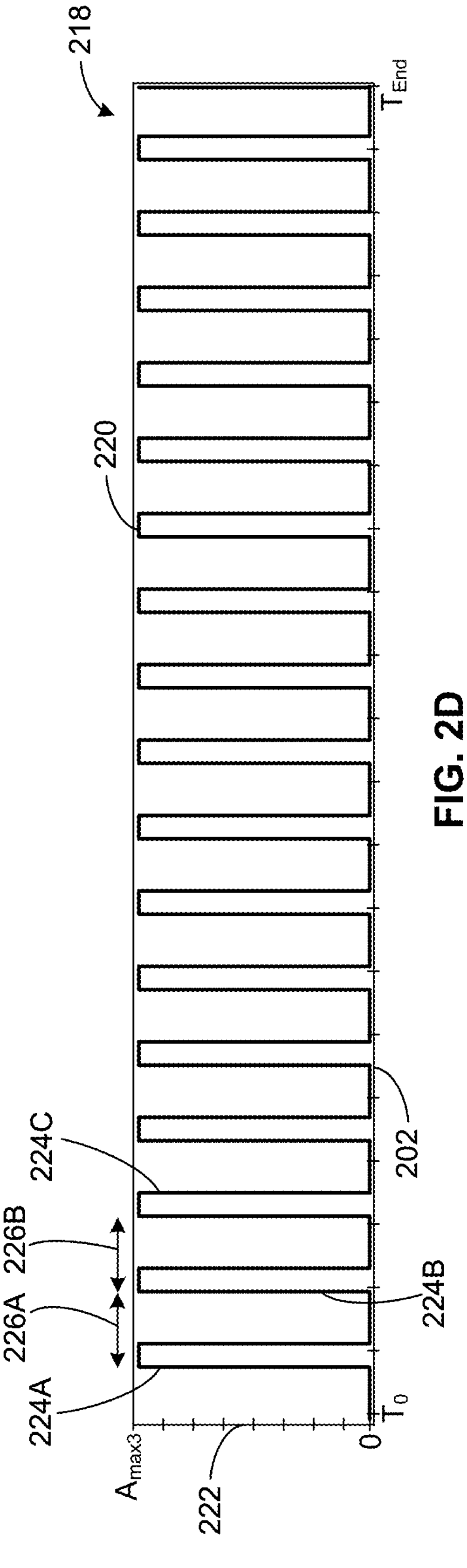
FIG. 2D is an example pulse waveform output by the example signal processing circuitry of FIG. 1.

FIG. 2D is an example fourth graph 218 including an example pulse waveform 220 output by the signal processing circuitry 102 of FIGS. 1 and 2. In the illustrated example of FIG. 2D, the fourth graph 218 includes the example x-axis 202 of FIG. 2A and an example third y-axis 222. The example third y-axis 222 of FIG. 2D is similar to the first y-axis 204 of FIG. 2A, except that the third y-axis 222 extends between 0 and $A_{max3}$. In some examples, the scale and range of the second y-axis 214 can be a preset value, based on a user input, and/or based on the magnitude of the tachometer signal 210.

The pulse waveform 220 can be generated by the signal processing circuitry 102 (e.g., by the waveform generator circuitry 314 of FIG. 3, etc.) based on the second signal 210 and an identified suitable one of the pulse threshold candidates 212A, 212B, 212C. As shown, the pulse waveform 220 has uniform, repeating pulses. Therefore, the signal processing circuitry 102 can generate a suitable pulse wave from the second signal 210. The pulse waveform 220 can be used to determine the speed of the rotating component 110 based on the frequency of the pulses of the example pulse waveform 220. In the illustrated example of FIG. 2D, the pulse waveform 220 includes an example first pulse 224A, an example second pulse 224B, and an example third pulse 224C. The pulses 224A, 224B, 224C correspond to distinct rotations of the rotating component 110 and can be used by the signal processing circuitry 102 to determine the rotational speed of the rotating component 110. In the illustrated example of FIG. 2D, the pulse waveform 220 includes an example first distance 226A between the beginning (e.g., the rising edge, etc.) of the first pulse 224A and the beginning (e.g., the rising edge, etc.) of the second pulse 226B and an example second distance 226B between the beginning (e.g., the rising edge, etc.) of the second pulse 224B and the beginning (e.g., the rising edge, etc.) of the third pulse 224C. The distances 226A, 226B are the times (e.g., the duration, etc.) between the (1) the beginning of the first pulse 224A and the beginning of the second pulse 224B and (2) the beginning of the second pulse 224B and the beginning of the third pulse 224C, respectively.

The signal processing circuitry 102 can determine the pulse waveform 220 is stable because the difference between the first distance 226A and the second distance 226B satisfies a stability threshold. In some examples, the stability threshold is approximately 6% (e.g., ±0.5%). Therefore, if the first distance 226A and the second distance 226B are within approximately 6% of each other, the pulse waveform 220 is determined to be stable. In other examples, if the difference between the first distance 226A and the second distance 226B does not satisfy a stability threshold (e.g., is not within approximately 6%), the signal processing circuitry 102 determines the pulse waveform 220 is not stable.

Figure 3:
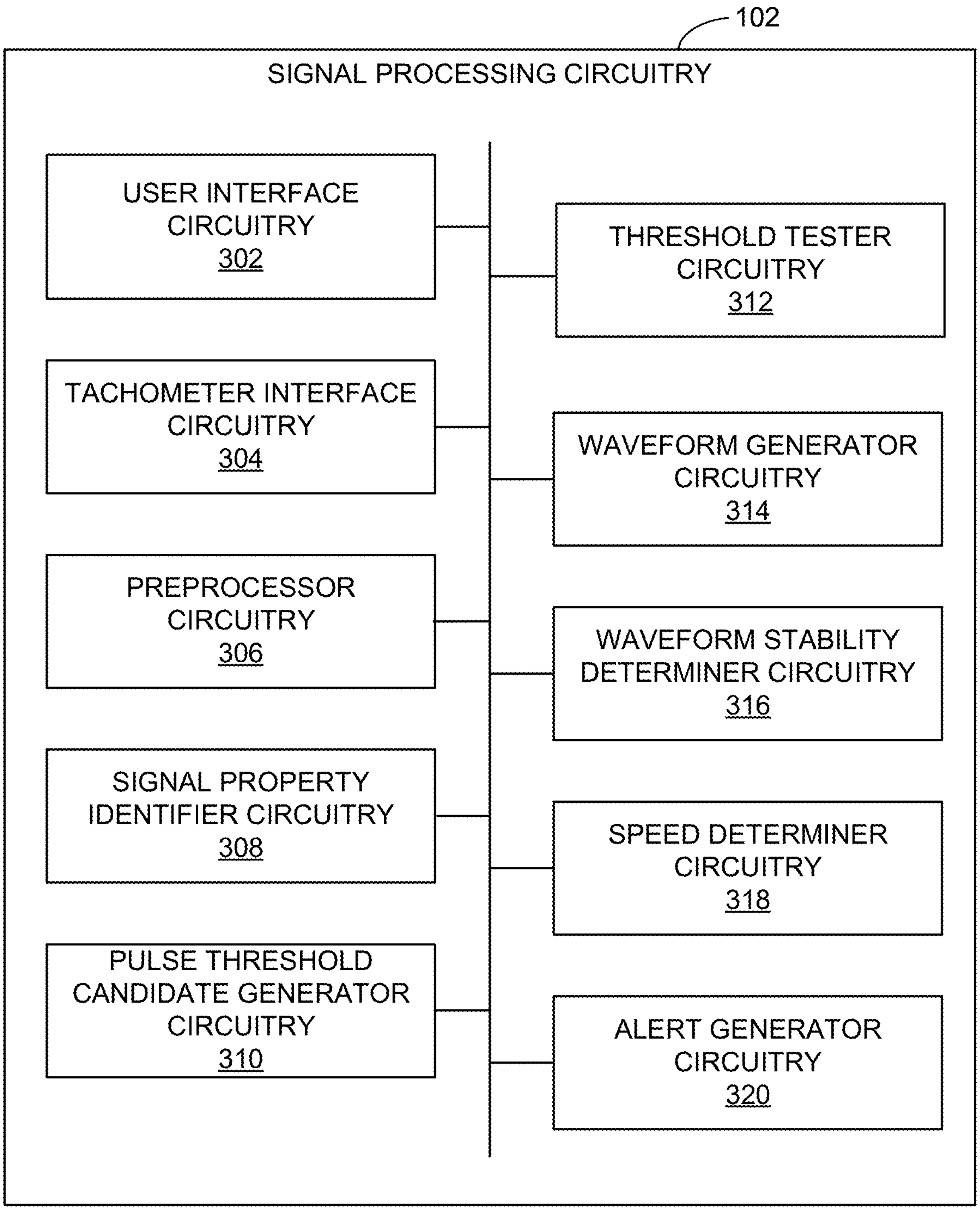
FIG. 3 is a block diagram of an example implementation of the signal processing circuitry of FIG. 1.

FIG. 3 is a block diagram of an example implementation of the signal processing circuitry 102 of FIG. 1 to process a signal output by the tachometer 104 and generate a pulse waveform. The signal processing circuitry 102 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the signal processing circuitry 102 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

In the illustrated example of FIG. 3, the signal processing circuitry 102 includes example user interface circuitry 302, example tachometer interface circuitry 304, example preprocessor circuitry 306, example signal property identifier circuitry 308, example pulse threshold candidate generator circuitry 310, example threshold tester circuitry 312, example waveform generator circuitry 314, example waveform stability determiner circuitry 316, example speed determiner circuitry 318, and example alert generator circuitry 320. In some examples, the circuitry 302-320 may be instantiated by programmable circuitry such as the example programmable circuitry 712 of FIG. 7. For instance, the circuitry 302-320 may be instantiated by the example microprocessor 800 of FIG. 8 executing machine executable instructions such as those implemented by one or more of the blocks of FIGS. 3, 4, and/or 5. In some examples, the circuitry 302-320 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the circuitry 302-320 may be instantiated by any other combination of hardware, software, and/or firmware. For example, the circuitry 302-320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The user interface circuitry 302 accesses and outputs information to a user of the testing instrument 108 via the user interface 114 (e.g., a display). For example, the user interface circuitry 302 can output a pulse waveform (e.g., the pulse waveform 220) generated by the waveform generator circuitry 314. In some examples, the user interface circuitry 302 outputs a rotational speed determined by the speed determiner circuitry 318 based on the generated pulse waveform. In some examples, the user interface circuitry 302 can output an alert generated by the alert generator circuitry 320. In some examples, the user interface circuitry 302 can output information visually (e.g., via a display, via an indicator light, etc.), audibly (e.g., via a speaker, etc.), and/or tactilely (e.g., via a vibration, etc.).

In some examples, the user interface circuitry 302 can access the nominal speed of the rotating component 110. The nominal speed is the expected speed and/or normal operational speed of the rotating component 110. In some examples, the signal processing circuitry 102 can assess a pulse threshold candidate (e.g., the pulse threshold candidates 212A, 212B, 212C of FIG. 2B, etc.) based on the nominal speed. In some examples, the user interface circuitry 302 can prompt, via the user interface 114, an operator of the testing instrument 108 to input a nominal speed of the rotating component 110. Additionally or alternatively, the user interface circuitry 302 can prompt a user of the testing instrument 108 to input a model of the machinery 106 and/or the rotating component 110. In some such examples, the user interface circuitry 302 can determine the nominal speed of the rotating component 110 based on the model of the machinery 106 and/or the rotating component 110 (e.g., from the memory 118, from an online database, etc.). Additionally or alternatively, the user interface circuitry 302 can access the nominal speed of the rotating component 110 by querying a controller of the machinery 106. Therefore, in some examples, the user interface circuitry 302 of the signal processing circuitry 102 implements means for interfacing with a user.

The tachometer interface circuitry 304 accesses the signal 103 output by the tachometer 104. For example, the tachometer interface circuitry 304 can access the signal 103 via a wired connection (e.g., a wire or cable between the testing instrument 108 of FIG. 1 and the tachometer 104 of FIG. 1, etc.). In other examples, the tachometer interface circuitry 304 can access the signal 103 via a wireless connection (e.g., via the transmitter 116, etc.). In some examples, the tachometer interface circuitry 304 converts the signal from an analog signal (e.g., a voltage, a current, etc.) to a digital signal. In some examples, the tachometer interface circuitry 304 samples the signal 103 at a preset frequency (e.g., 50,000 samples per second, 100,000 samples per second, etc.). In other examples, the tachometer interface circuitry 304 can sample the signal 103 at a frequency determined based on the nominal speed of the rotating component 110 (e.g., a faster nominal speed is associated with a faster sampling speed, etc.). Therefore, in some examples, the tachometer interface circuitry 304 of the signal processing circuitry 102 implements means for interfacing with a tachometer.

The preprocessor circuitry 306 preprocesses the signal 103 accessed by the tachometer 104. For example, the preprocessor circuitry 306 can preprocess the signal 103 through a low pass filter. In some such examples, the preprocessor circuitry 306 can filter the signal 103 via a low pass filter with a 250 Hz cutoff frequency (e.g., corner frequency, break frequency, etc.). In some examples, the preprocessor circuitry 306 filters the signal 103 via a finite impulse filter (FIR). In some examples, the preprocessor circuitry 306 can preprocess the signal 103 by removing a direct current (DC) component of the signal 103. For example, the preprocessor circuitry 306 can average the amplitude of the signal 103 and offset the signal 103 to have an average amplitude of zero. Additionally or alternatively, the preprocessor circuitry 306 can remove the DC component of the signal 103 via a differential amplifier and an inverter. In other examples, the preprocessor circuitry 306 can remove the DC component of the signal 103 in any other suitable manner. Therefore, in some examples, the preprocessor circuitry 306 of the signal processing circuitry 102 implements means for preprocessing a tachometer signal.

The signal property identifier circuitry 308 determines one or more signal properties (e.g., signal quantities, signal parameters, etc.) related to the signal 103. In some examples, the properties include the signal extrema, signal averages, and/or standard deviation of the signal 103. For example, the signal property identifier circuitry 308 can determine the extrema (e.g., the minimum, the maximum, etc.), the signal mean, and/or the standard deviation of the preprocessed signal output by the preprocessor circuitry 306. In some examples, the signal property identifier circuitry 308 can determine other statistical properties related to the signal 103 (e.g., the range, the mode, the median, etc.). The signal property identifier circuitry 308 determines, based on the signal extrema, signal averages, and/or standard deviation, if the pulse threshold is positive or negative. For example, the signal property identifier circuitry 308 can determine if the pulse threshold amplitude is less than or greater than zero. In some such examples, the signal property identifier circuitry 308 can determine the sign of the pulse threshold based on the difference between (1) the difference between the signal maxima and the signal mode and (2) the absolute value of the difference between the signal minima and the signal mode. Therefore, in some examples, the signal property identifier circuitry 308 of the signal processing circuitry 102 implements means for determining a property of a tachometer signal.

The pulse threshold candidate generator circuitry 310 generates and/or sets pulse threshold candidates based on the sign of the pulse threshold (e.g., if the signal property identifier circuitry 308 determines the pulse threshold is positive, if the signal property identifier circuitry 308 determines the pulse threshold is negative, etc.) and the signal properties determined by the signal property identifier circuitry 308. In the illustrated example of FIG. 2B, the pulse threshold candidate generator circuitry 310 generated three pulse threshold candidates (e.g., the pulse threshold candidates 212A, 212B, 212C, etc.). In other examples, the pulse threshold candidate generator circuitry 310 can determine any suitable number of pulse threshold candidates (e.g., one, two, three, five, twelve, fifty, etc.). In some examples, if the pulse threshold is positive, the pulse threshold candidate generator circuitry 310 can set a first pulse threshold candidate value as half of the signal maxima, a second pulse threshold candidate value as the signal standard deviation, and a third pulse threshold candidate value as the sum of the signal standard deviation and the signal median. In some examples, if the pulse threshold is negative, the pulse threshold candidate generator circuitry 310 can set a first pulse threshold candidate value as the negative of half of the signal minima, a second pulse threshold candidate value as the negative of signal standard deviation, and a third pulse threshold candidate value as the negative of the sum of the signal standard deviation and the signal median.

In some examples, the pulse threshold candidate generator circuitry 310 can determine and/or apply a pulse threshold candidate modifier to one of the pulse threshold candidates determined by the pulse threshold candidate generator circuitry 310. In some examples, the pulse threshold candidate is a fixed value based on whether the pulse threshold is positive (e.g., 0.3, etc.) or negative (e.g., −0.3, etc.). In other examples, the pulse threshold candidate generator circuitry 310 can determine a modifier based on one or more of the signal properties of the signal 103 (e.g., a signal maxima, a signal minima, a signal median, etc.). In some such examples, the pulse threshold candidate generator circuitry 310 can apply the determined modifier (e.g., additively, multiplicatively, etc.) to one or more pulse threshold candidates if those pulse threshold candidate(s) are determined to not be suitable by the threshold tester circuitry 312. Therefore, in some examples, the pulse threshold candidate generator circuitry 310 of the signal processing circuitry 102 implements means for generating a pulse threshold candidate.

The threshold tester circuitry 312 evaluates the generated and/or modified pulse threshold candidates created by the pulse threshold candidate generator circuitry 310 (e.g., the pulse threshold candidates 212A, 212B, 212C of FIG. 2, etc.). For example, the threshold tester circuitry 312 can evaluate (e.g., test, assess, etc.) the pulse threshold candidates with one or more testing criteria to identify a suitable threshold to generate a pulse waveform (e.g., the pulse threshold 217, etc.). For example, the threshold tester circuitry 312 can evaluate a pulse threshold candidate based on a pulse presence testing criterion (e.g., based on the presence of pulses of a waveform generated via the pulse threshold candidate, etc.). In some such examples, the threshold tester circuitry 312 can determine if the number of pulses of the generated waveform is greater than zero. For example, the threshold tester circuitry 312 can determine if the waveform generated by the waveform generator circuitry 314 with the selected pulse threshold candidate is greater than zero. If the threshold tester circuitry 312 determines the generated waveform does not have more than zero pulses, the threshold tester circuitry 312 determines the associated pulse presence candidate does not satisfy the pulse presence testing criterion and is not suitable.

Additionally or alternatively, the threshold tester circuitry 312 can evaluate a pulse threshold candidate based on a stability testing criterion, which may also be referred to herein as an inconsistent testing criterion or reliability testing criterion. For example, the threshold tester circuitry 312 can evaluate the pulse threshold candidate based on the output of the waveform stability determiner circuitry 316. The waveform stability determiner circuitry 316 outputs a data structure corresponding to differences between adjacent pulses (e.g., the pulses 224A, 224B, 224C, etc.) of the generated pulse waveform (e.g., the speeds per pulse, the time between the beginnings of adjacent pulses, etc.). As used herein, the phrase "speed per pulse" refers to the inverse of the time between the beginnings of adjacent pulses (e.g., the inverse of the distances 226A, 226B, etc.). For example, the threshold tester circuitry 312 can determine whether the ratio of the distances 226A, 226B of FIG. 2D is within a threshold range and/or satisfies a stability threshold. For example, the threshold tester circuitry 312 can determine if the ratio of the distances 226A, 226B is between 0.94 and 1.06 (e.g., approximately 6%, etc.). In some examples, the threshold tester circuitry 312 can determine if some or all of the pulses of a pulse waveform satisfy the stability testing criterion. In such examples, if the threshold tester circuitry 312 determines that the difference between any one of the outputs of the waveform stability determiner circuitry 316 does not satisfy the threshold range, the threshold tester circuitry 312 determines the pulse threshold candidate does not satisfy the stability threshold and is not suitable.

Additionally or alternatively, the threshold tester circuitry 312 can evaluate a pulse threshold candidate based on a speed testing criterion. For example, the threshold tester circuitry 312 can determine if the output of the speed determiner circuitry 318 (e.g., the average speed of the rotating component 110, etc.) is within a speed range defined by the nominal speed (e.g., received via the user interface circuitry 302, etc.). In some examples, the nominal speed of a rotating component driven is between the synchronous speed of the rotating component and the service factor speed (e.g., 120% of the full load speed, etc.). As used herein, the terms "nominal speed" and "nameplate speed" are used interchangeably. In some examples, the threshold tester circuitry 312 determines if the average speed is within a threshold range defined by 98% of the nominal speed and 102% of the nominal speed. In other examples, the range is any other suitable range based on the nominal speed. In some such examples, if the threshold tester circuitry 312 determines that the average speed of the rotating component 110 determined via a generated pulse waveform is not within the speed range associated with the nominal speed of the rotating component, the threshold tester circuitry 312 determines the pulse threshold candidate does not satisfy the speed testing criterion and is not suitable.

Additionally or alternatively, the threshold tester circuitry 312 can evaluate a pulse threshold candidate based on a pulse quantity testing criterion. For example, the threshold tester circuitry 312 can determine a pulse quantity range based on the length of the sample of the signal 103 (e.g., the sample time, etc.) and the threshold speed range associated with the speed threshold (e.g., one or more of the boundaries associated with the threshold speed range, etc.). In some such examples, the threshold tester circuitry 312 can determine if the number of pulses is within the pulse range. Therefore, in some examples, the threshold tester circuitry 312 of the signal processing circuitry 102 implements means for testing a pulse threshold candidate. The waveform generator circuitry 314 generates pulse waveforms using pulse threshold candidates and/or the identified pulse waveform. For example, the waveform generator circuitry 314 can generate a pulse of the waveform each time the amplitude of the preprocessed signal exceeds the pulse threshold. In some such examples, the waveform generator circuitry 314 generates a pulse such that the width of each pulse is equal to the ratio of (1) the sampling period divided by the nominal speed and (2) a pulse width divisor. In some examples, the pulse width divisor is 3. In other examples, the waveform generator circuitry 314 can select the pulse width divisor as any suitable value between 1 and 5. In some such examples, the use of a preset pulse width divisor by the waveform generator circuitry 314 mitigates potential hysteresis caused by noise in the signal 103. That is, if the signal 103 decreases beneath the pulse threshold during the present pulse width, a new pulse is not triggered.

The waveform stability determiner circuitry 316 determines the difference(s) (e.g., time between, durations, etc.) between adjacent pulses of the generated waveform. For example, the waveform stability determiner circuitry 316 can determine the temporal distance between adjacent ones of the pulses of a waveform generated by the waveform generator circuitry 314 via the selected pulse threshold candidate. In some examples, the waveform stability determiner circuitry 316 determines a first distance between the beginning of a first pulse and the beginning of a second pulse of the waveform, a second distance between the beginning of the second pulse and the beginning of a third pulse of the waveform, etc. In some such examples, the first distance and the second distance can be used by the threshold tester circuitry 312 to assess a stability or reliability of the generated waveform (e.g., by comparing a difference between the distances to a stability threshold). In some examples, the waveform stability determiner circuitry 316 stores the determined differences (e.g., distances, etc.) between the pulses in a data structure (e.g., an array, a vector, etc.). In some examples, the differences determined by the waveform stability determiner circuitry 316 are indicative of the stability of the generated waveform (e.g., the regularity of the waveform, etc.). Additionally or alternatively, the waveform stability determiner circuitry 316 can determine the speed per pulse for each pair of pulses of the waveform based on the determined differences and the sampling period of the signal 103 (e.g., as the inverse of the product of the sampling period and the time between the rising edges of adjacent pulses, as the inverse of the product of the sampling period and the time between the falling edges of adjacent pulses, etc.). In some such examples, the threshold tester circuitry 312 uses the output of the waveform stability determiner circuitry 316 to determine if the generated waveform is stable. Therefore, in some examples, the waveform stability determiner circuitry 316 of the signal processing circuitry 102 implements means for testing a pulse threshold candidate.

The speed determiner circuitry 318 determines the rotational speed of the rotating component 110. In some examples, the speed determiner circuitry 318 determines the rotational speed of the rotating component 110 based on the pulse waveform generated by the waveform generator circuitry 314. For example, the speed determiner circuitry 318 can determine the rotational speed based on the product of (1) the sampling rate of the tachometer interface circuitry 304 (e.g., the time between each pulse, etc.) and (2) the width of the pulses of the generated pulse waveform. In other examples, the speed determiner circuitry 318 can determine the speed of the pulse in any other suitable manner. Therefore, in some examples, the speed determiner circuitry 318 of the signal processing circuitry 102 implements means for determining of a speed of rotating machinery.

The alert generator circuitry 320 can generate alerts and/or warnings to a user of the testing instrument 108. For example, the alert generator circuitry 320 can generate an alert indicating that no threshold and speed have been found by the signal processing circuitry 102. In some examples, the alert generator circuitry 320 generates a visual alert, an audio alert, and/or a tactile alert that no alert has been found. Additionally or alternatively, the alert generator circuitry 320 can generate instructions to reposition the tachometer 104 to another position relative to the rotating component 110. Therefore, in some examples, the alert generator circuitry 320 of the signal processing circuitry 102 implements means for generating an alert.

While an example manner of implementing the signal processing circuitry 102 of FIG. 1 is illustrated in FIG. 3, one or more of the elements, processes, and/or devices illustrated in FIG. 3 may be combined, divided, re-arranged, omitted, eliminated, and/or implemented in any other way. Further, the example user interface circuitry 302, the example tachometer interface circuitry 304, the example preprocessor circuitry 306, the example signal property identifier circuitry 308, the example pulse threshold candidate generator circuitry 310, the example threshold tester circuitry 312, the example waveform generator circuitry 314, the example waveform stability determiner circuitry 316, the example speed determiner circuitry 318, the example alert generator circuitry 320, and/or, more generally, the example signal processing circuitry 102 of FIG. 3, may be implemented by hardware alone or by hardware in combination with software and/or firmware. Thus, for example, any of the example user interface circuitry 302, the example tachometer interface circuitry 304, the example preprocessor circuitry 306, the example signal property identifier circuitry 308, the example pulse threshold candidate generator circuitry 310, the example threshold tester circuitry 312, the example waveform generator circuitry 314, the example waveform stability determiner circuitry 316, the example speed determiner circuitry 318, the example alert generator circuitry 320, and/or, more generally, the example signal processing circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example signal processing circuitry 102 of FIG. 3 may include one or more elements, processes, and/or devices in addition to, or instead of, those illustrated in FIG. 3, and/or may include more than one of any or all of the illustrated elements, processes and devices.

Figure 4:
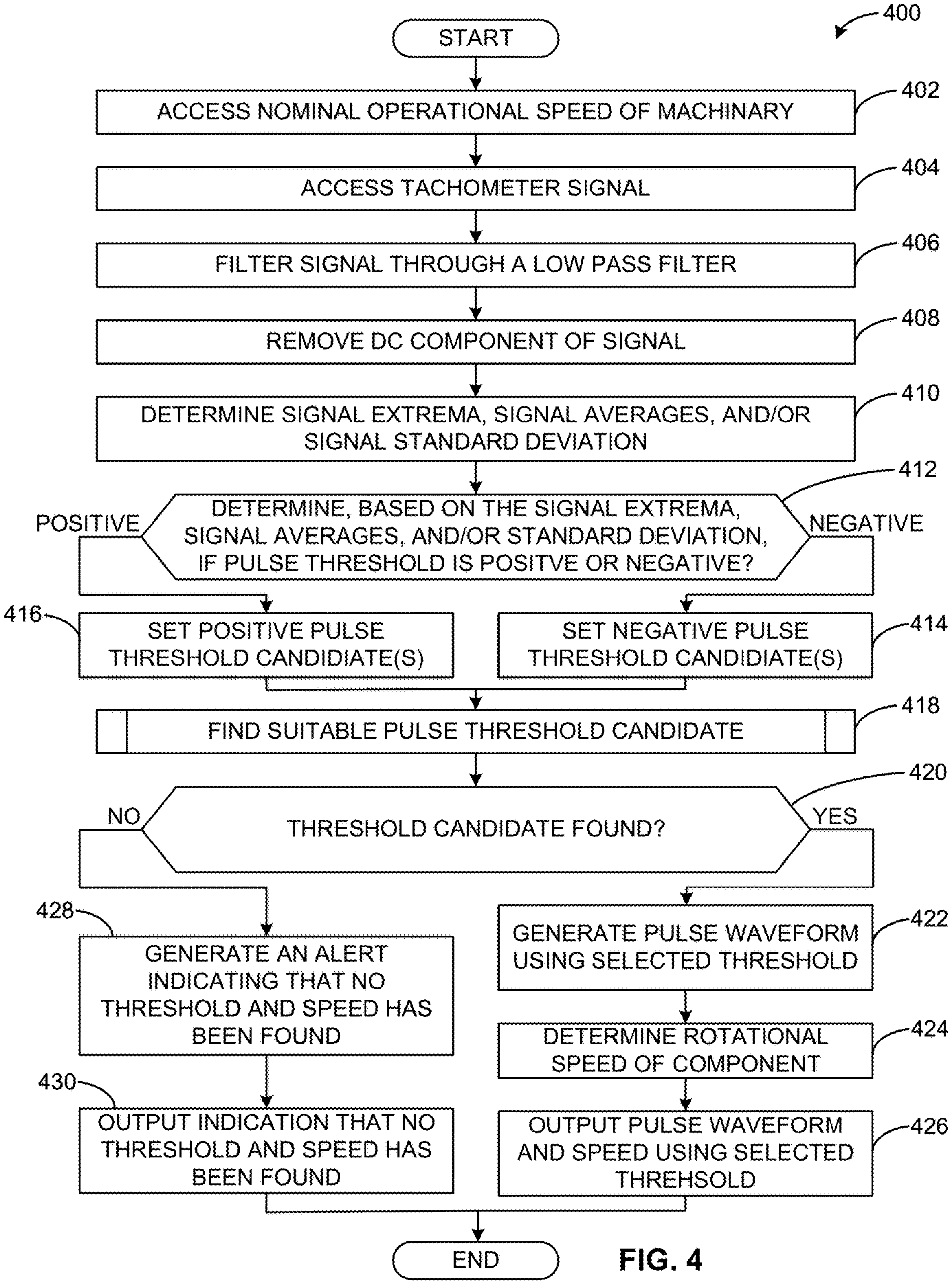
FIGS. 4, 5, and 6 are flowcharts representative of example machine readable instructions and/or example operations that may be executed, instantiated, and/or performed by example programmable circuitry to implement the example signal processing circuitry of FIGS. 1 and 2.
Figure 5:
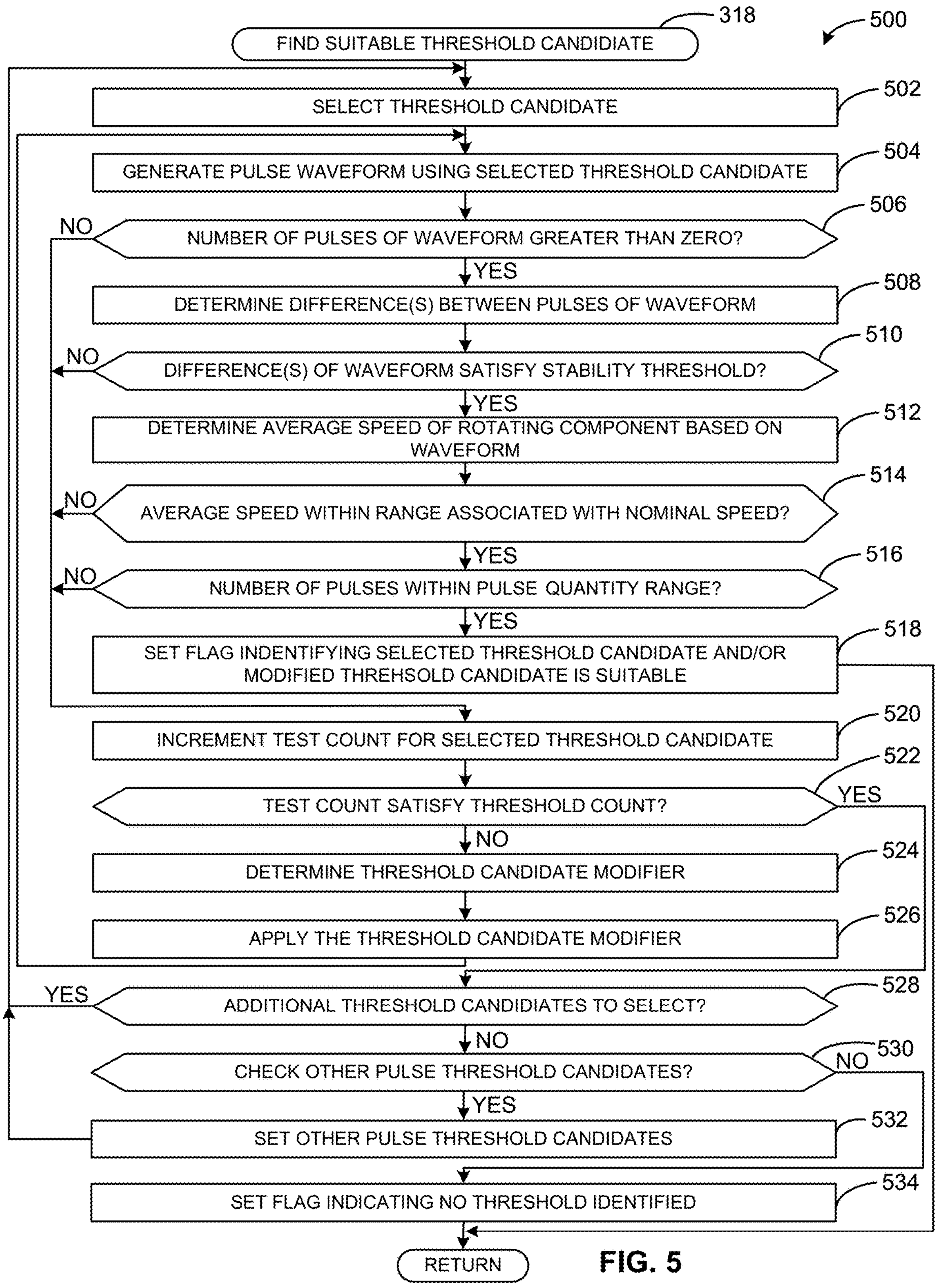
Figure 6:
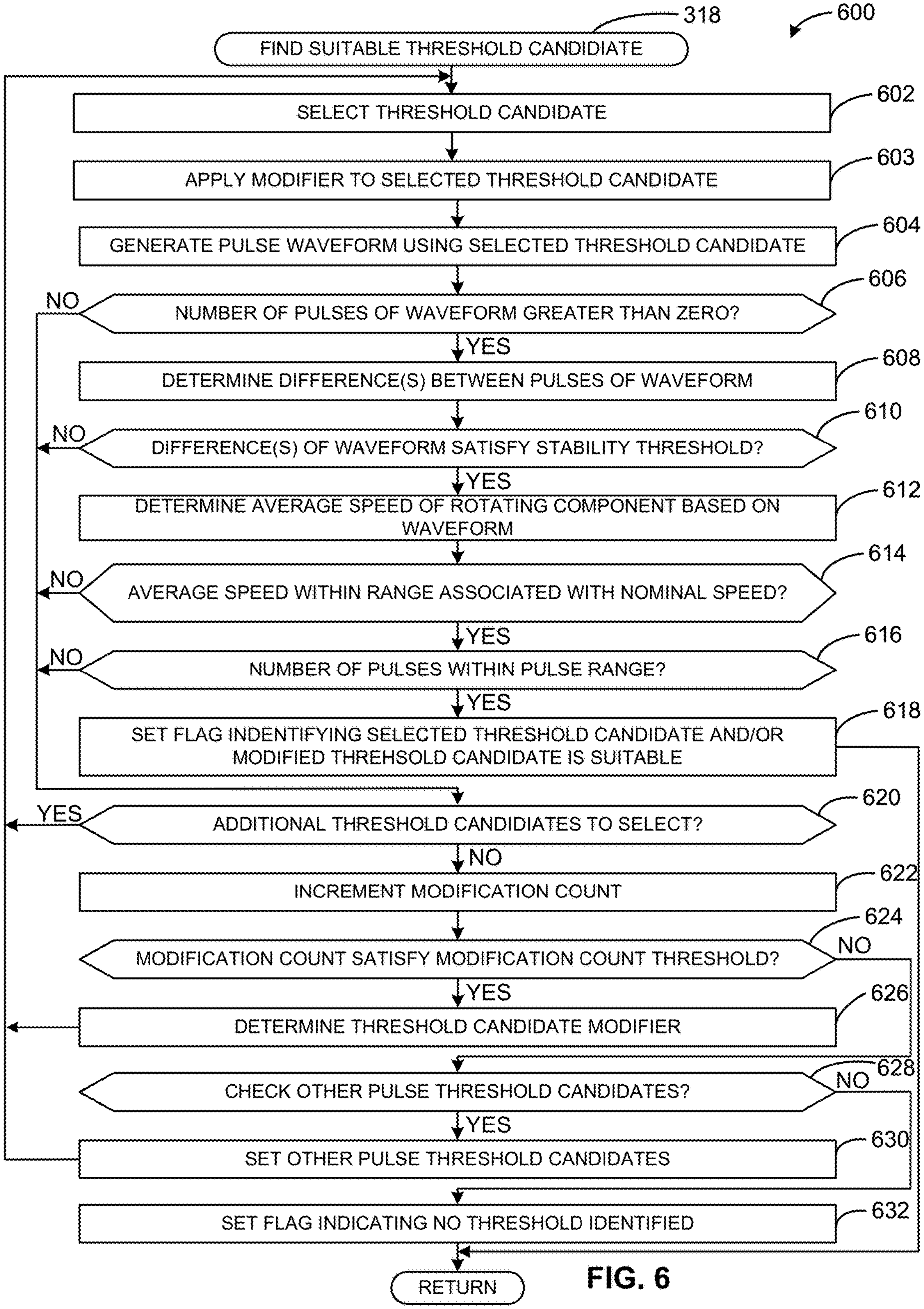

Flowchart(s) representative of example machine readable instructions, which may be executed by programmable circuitry to implement and/or instantiate the signal processing circuitry of FIG. 3 and/or representative of example operations which may be performed by programmable circuitry to implement and/or instantiate the signal processing circuitry of FIG. 3, are shown in FIGS. 4-6. The machine readable instructions may be one or more executable programs or portion(s) of one or more executable programs for execution by programmable circuitry such as the programmable circuitry 712 shown in the example programmable circuitry platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 4-6, many other methods of implementing the example signal processing circuitry may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4-6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed, instantiated, and/or performed by programmable circuitry to generate a pulse waveform from a signal output by the tachometer 104. The example machine-readable instructions and/or the example operations 400 of FIG. 4 begin at block 402, at which the user interface circuitry 302 accesses the nominal speed of the rotating component 110. The nominal speed may be a rotational speed, such as revolutions-per-minute (RPM). In some examples, the user interface circuitry 302 prompts, via the user interface 114, a user of the testing instrument 108 to input a nominal speed of the rotating component 110 of the machinery 106. For instance, the user may have knowledge of the nominal speed of the rotating component 110. Additionally or alternatively, the user interface circuitry 302 can prompt a user of the testing instrument 108 to input a model of the machinery 106 and/or the rotating component 110. In some such examples, the user interface circuitry 302 can determine the nominal speed of the rotating component 110 based the model of the machinery 106 and/or the rotating component 110 (e.g., from a database of models and nominal speeds stored in the memory 118, from an online database, etc.). Additionally or alternatively, the user interface circuitry 302 can access the nominal speed of the rotating component 110 by querying a controller of the machinery 106.

At block 404, the tachometer interface circuitry 304 accesses the signal 103. For example, the tachometer interface circuitry 304 can access the signal 103 via a wired or wireless connection. In some examples, the tachometer interface circuitry 304 converts the signal from an analog signal (e.g., a voltage, a current, etc.) to a digital signal. In some examples, the tachometer interface circuitry 304 samples the signal 103 at a preset frequency (e.g., 50,000 samples per second, 100,000 samples per second, etc.). In other examples, the tachometer interface circuitry 304 samples the signal 103 at a frequency determined based on the nominal speed of the rotating component 110 (e.g., a faster nominal speed is associated with a faster sampling speed, etc.).

At block 406, the preprocessor circuitry 306 filters the signal 103 through a low pass filter. For example, the preprocessor circuitry 306 can filter the signal 103 via a low pass filter with a 250 Hz cutoff frequency (e.g., corner frequency, break frequency, etc.) to remove high frequency noise from the signal 103. In other examples, the preprocessor circuitry 306 can filter the signal 103 with a filter with a higher or lower cutoff frequency. In some examples, the preprocessor circuitry 306 can filter the signal 103 via a finite impulse filter (FIR).

At block 408, the preprocessor circuitry 306 removes a direct current (DC) component of the signal 103 (e.g., the DC offset of the signal, etc.). In some examples, the preprocessor circuitry 306 averages the amplitude of the signal 103 and offsets the signal 103 to have an average amplitude of zero. Additionally or alternatively, the preprocessor circuitry 306 can remove the DC component of the signal 103 via a differential amplifier and an inverter.

At block 410, the signal property identifier circuitry 308 determines one or more properties of the signal 103. In this example, the signal property identifier circuitry 308 determines the signal extrema, signal averages, and/or standard deviation of the signal 103. In some examples, the signal property identifier circuitry 308 determines these properties of the preprocessed signal output by the preprocessor circuitry 306 after the execution of block 406 and/or block 408. Additionally or alternatively, the signal property identifier circuitry 308 can determine other properties related to the signal 103 (e.g., the range, the mode, the median, etc.).

At block 412, the signal property identifier circuitry 308 determines, based on the signal extrema, signal averages, and/or standard deviation, if the pulse threshold is positive or negative. For example, the signal property identifier circuitry 308 can determine if the pulse threshold amplitude is less than or greater than zero. For example, the signal property identifier circuitry 308 can determine the difference between (1) the difference between the signal maxima and the signal mode and (2) the absolute value of the difference between the signal minima and the signal mode. If the difference is positive (e.g., the difference between the signal maxima and the signal mode is greater than the absolute value of the difference between the signal minima and the signal mode, etc.), the signal property identifier circuitry 308 determines the pulse threshold is positive. If the difference is negative (e.g., the difference between the signal maxima and the signal mode is less than the absolute value of the difference between the signal minima and the signal mode, etc.), the signal property identifier circuitry 308 determines the pulse threshold is negative. If the signal property identifier circuitry 308 determines the pulse threshold is negative, the operations 400 advance to block 414. If the signal property identifier circuitry 308 determines the pulse threshold is positive, the operations 400 advance to block 416.

If the pulse threshold is positive, the pulse threshold candidate generator circuitry 310, at block 416, determines or sets one or more positive candidate pulse threshold value(s). In other words, the pulse threshold candidate generator circuitry 310 sets one or more pulse thresholds that are positive (e.g., greater than zero, etc.). In some examples, the pulse threshold candidate generator circuitry 310 determines or sets only one candidate pulse threshold value. In other examples, the pulse threshold candidate generator circuitry 310 can determine or set multiple pulse threshold candidates (e.g., one positive pulse threshold candidate, two positive pulse threshold candidates, three positive pulse threshold candidates, etc.). In some examples, the pulse threshold candidate generator circuitry 310 determines or sets three positive pulse threshold candidate values, such as shown in FIG. 2B. For example, the pulse threshold candidate generator circuitry 310 may determine or set a first pulse threshold candidate value at half of the signal maxima, a second pulse threshold candidate value at the signal standard deviation, and a third pulse threshold candidate value at the sum of the signal standard deviation and the signal median. Additionally or alternatively, the pulse threshold candidate generator circuitry 310 can determine or set additional pulse threshold candidates based on other ones of the signal properties (e.g., a pulse threshold candidate set as the sum of the signal standard deviation and the signal mode, a pulse threshold candidate set as the sum of the signal standard deviation and the signal mean, etc.).

If the pulse threshold is negative, the pulse threshold candidate generator circuitry 310, at block 414, determines or sets one or more negative candidate pulse threshold value(s). In other words, the pulse threshold candidate generator circuitry 310 determines sets one or more pulse thresholds that are negative (e.g., less than zero, etc.). In some examples, the pulse threshold candidate generator circuitry 310 determines or sets only one candidate pulse threshold value. In other examples, the pulse threshold candidate generator circuitry 310 can determine or set multiple pulse threshold candidates (e.g., one negative pulse threshold candidate, two negative pulse threshold candidates, three negative pulse threshold candidates, etc.). In some examples, the pulse threshold candidate generator circuitry 310 determines or sets three negative pulse threshold candidate values. For example, the pulse threshold candidate generator circuitry 310 may set a first pulse threshold candidate value at half of the signal minima, a second pulse threshold candidate value at the opposite of signal standard deviation, and a third pulse threshold candidate value at the sum of the opposite of the signal standard deviation and the signal median. Additionally or alternatively, the pulse threshold candidate generator circuitry 310 can determine or set additional pulse threshold candidates based on other ones of the signal properties (e.g., a pulse threshold candidate set as the sum of the opposite signal standard deviation and the signal mode, a pulse threshold candidate set as the sum of the opposite of the signal standard deviation and the signal mean, etc.).

At block 418, the threshold tester circuitry 312, the waveform generator circuitry 314, the waveform stability determiner circuitry 316, and/or the speed determiner circuitry 318 undergo operations to find a suitable pulse threshold candidate. For example, the threshold tester circuitry 312 can determine a pulse threshold candidate is suitable if the pulse waveform generated therefrom has stable (e.g., consistent, etc.) pulses and a frequency corresponding to the nominal speed. The signal processing circuitry 102 determines whether a pulse threshold candidate (e.g., the first pulse threshold candidate 212A of FIG. 2B, etc.) satisfies one or more testing criteria. If a pulse threshold candidate does not satisfy the one or more resting criteria, the signal processing circuitry 102 sets or determines another (second) pulse threshold candidate to check against the testing criterion. The second pulse threshold candidate may be another predetermined pulse threshold candidate (e.g., the second pulse threshold candidate 212B of FIG. 2B) or can be a modification to the prior pulse threshold candidate (e.g., adding or removing a certain value from the pulse threshold candidate). Example operations for the execution of block 418 are described below in conjunction with FIGS. 5 and 6. At block 420, the threshold tester circuitry 312 determines if a suitable threshold was found. For example, the threshold tester circuitry 312 can determine if a suitable pulse threshold was found during the execution of block 418. In some examples, a suitable threshold may not be found if the surface variation of the rotating component 110 is not sufficiently distinctive, the signal 103 is noisy, etc. If the threshold tester circuitry 312 determines a suitable threshold was found, the operations 400 advance to block 422. If the threshold tester circuitry 312 determines a suitable threshold was not found, the operations 400 advance to block 428.

If a suitable threshold was found, the waveform generator circuitry 314, at block 422, generates a waveform using the identified pulse threshold. For example, the waveform generator circuitry 314 can generate a pulse of the waveform each time the amplitude of the preprocessed signal exceeds the pulse threshold. In some such examples, the waveform generator circuitry 314 generates a pulse such that the width of each pulse is equal to the ratio of (1) the sampling period divided by the nominal speed and (2) a pulse width divisor. In some examples, the pulse width divisor is 3. In other examples, the waveform generator circuitry 314 can select the pulse width divisor as any suitable value between 1.25 and 5.

At block 424, the speed determiner circuitry 318 determines the rotational speed of the rotating component 110. In some examples, the speed determiner circuitry 318 determines the rotational speed of the rotating component 110 based on the pulse waveform generated by the waveform generator circuitry 314 during the execution of block 422. For example, the speed determiner circuitry 318 can determine the rotational speed based on the product of (1) the sampling rate of the tachometer interface circuitry 304 (e.g., the time between each pulse, etc.) and (2) the time between the rising edges of adjacent pulses of the pulse waveform.

At block 426, the user interface circuitry 302 outputs the pulse waveform (generated at block 422) and/or the rotational speed (determined at block 424). In some examples, the user interface circuitry 302 can output the rotational speed and/or the pulse waveform via the user interface 114. For example, the user interface circuitry 302 can cause a graphical user interface of the testing instrument 108 (e.g., the user interface 114, etc.) to present the rotational speed and/or the pulse waveform (e.g., the pulse waveform 220 of FIG. 2B).

If no suitable pulse threshold candidate is found, the alert generator circuitry 320, at block 428, generates an alert indicating that no threshold and speed has been found by the signal processing circuitry 102. For example, the alert generator circuitry 320 can generate a visual alert (e.g., a message on a GUI of a display of the testing instrument 108), an audio alert, and/or a tactile alert that no alert has been found. In some examples, the alert generator circuitry 320 generates instructions to reposition the tachometer 104 to another position relative to the rotating component 110. At block 430, the user interface circuitry 302 outputs the alert that no threshold and speed have been found. The operations 400 end.

FIG. 5 is a flowchart representative of example machine readable instructions and/or example operations 500 that may be executed, instantiated, and/or performed by programmable circuitry to find a suitable pulse threshold candidate to generate a pulse waveform from a tachometer signal. The example machine-readable instructions and/or the example operations 500 of FIG. 5 may be implemented to execute block 418 of FIG. 4. The example machine-readable instructions and/or the example operations 500 of FIG. 5 begin at block 502, at which the threshold tester circuitry 312 selects a pulse threshold candidate. In some examples, the threshold tester circuitry 312 selects a pulse threshold candidate generated by the pulse threshold candidate generator circuitry 310 during the execution of block 414 of FIG. 3 or during the execution of block 416 of FIG. 4. In some examples, the threshold tester circuitry 312 can select a previously unselected one of the pulse threshold candidates (e.g., unselected during previous executions of block 502). Additionally or alternatively, the threshold tester circuitry 312 can select one of the pulse threshold candidates randomly or sequentially.

At block 504, the waveform generator circuitry 314 generates a pulse waveform using the selected pulse threshold candidate. For example, the waveform generator circuitry 314 can generate a pulse each time the amplitude of the preprocessed signal exceeds the pulse threshold candidate. In some such examples, the waveform generator circuitry 314 generates a pulse such that the width of each pulse is equal to the ratio of (1) the sampling period divided by the nominal speed and (2) a pulse width divisor. For example, if the signal 103 is sampled at a sampling frequency of 102,400 Hz and the rotating component has a nominal speed of 29.75 Hz (e.g., 1785 RPM, etc.), and the pulse width divisor is 3, the waveform generator circuitry 314 will generate a pulse waveform with a pulse width of 1147 bins (e.g., sampling frequency divided by the nominal speed divided by the pulse width divisor, etc.). In some such examples, each bin has a width of 1/sampling frequency (e.g., or 1/102,400 Hz, 0.00001 seconds, etc.). In some such examples, the width of the pulse is 0.0112 seconds (e.g., the product of the bin width and the number of bins per pulse, etc.). It should be appreciated that each iteration of block 504 generates different pulse waveforms. For example, a first iteration of block 504 can generate a first pulse waveform via a first pulse threshold candidate (e.g., the first pulse threshold candidate 212A of FIG. 2B, etc.), a second iteration of block 504 can generate a second pulse waveform via a modification of the first pulse threshold candidate (e.g., modified during the execution of block 526, etc.), and/or a third iteration of block 504 can generate a third pulse waveform via a second pulse threshold candidate (e.g., the second pulse threshold candidate 212B of FIG. 2B, etc.).

At block 506, the threshold tester circuitry 312 determines if the number of pulses of the generated waveform is greater than zero. If the threshold tester circuitry 312 determines the number of pulses of the generated waveform is not greater than zero, the operations 500 advance to block 520. If the threshold tester circuitry 312 determines the number of pulses of the generated waveform is greater than zero, the operations 500 advance to block 508.

If the number of pulses of the generated waveform is greater than zero, the waveform stability determiner circuitry 316, at block 508, determines the differences between adjacent pulses of the generated waveform. For example, the waveform stability determiner circuitry 316 can determine the time (e.g., the time between the beginning of a pulse and a beginning of a next pulse, etc.) between adjacent ones of the pulses of the waveform of the waveform generator circuitry 314 via the selected pulse threshold candidate. For example, the waveform stability determiner circuitry 316 can determine the distance between the beginning of a first pulse and the beginning of a second pulse of the waveform, the temporal distance between the beginning of the second pulse and the beginning of a third pulse of the waveform, etc. In some examples, the waveform stability determiner circuitry 316 can store the determined differences (e.g., time, duration, speeds per pulse, etc.) between the pulses in a data structure (e.g., an array, a vector, etc.). In some examples, the waveform stability determiner circuitry 316 can determine the speed per pulse for each pair of pulses of the waveform based on the determined differences and the sampling period of the signal 103 (e.g., as the inverse of the product of the sampling period and the determined difference between adjacent pulses, etc.).

At block 510, the threshold tester circuitry 312 determines if the waveform generated via the selected pulse candidate threshold is stable. For example, the threshold tester circuitry 312 can determine if the output of the waveform stability determiner circuitry 316 (e.g., the speeds per pulse, the temporal differences, etc.) are sufficiently similar (e.g., satisfies a stability testing threshold, etc.). In some examples, the threshold tester circuitry 312 determines whether the ratio of adjacent ones of the outputs is within a threshold range (e.g., a ratio between the speed per pulse of adjacent pulses, a ratio between the differences between adjacent pulses, etc.). For example, the threshold tester circuitry 312 can determine if the ratio of the outputs is between 0.94 and 1.06. In such examples, if the threshold tester circuitry 312 determines that the difference between any one of the outputs of the waveform stability determiner circuitry 316 does not satisfy the threshold range (e.g., is outside of the range of 0.94 and 1.06), the threshold tester circuitry 312 determines the pulse threshold candidate does not satisfy the stability threshold and is not suitable. In other examples, the threshold range is any other suitable range of values. If the threshold tester circuitry 312 determines the generated waveform is not stable, the operations 500 advance to block 520. If the threshold tester circuitry 312 determines the generated waveform is stable (e.g., within the threshold range of 0.94 and 1.06), the operations 500 advance to block 512.

At block 512, the speed determiner circuitry 318 determines the average speed of the rotating component 110 based on the generated pulse waveform. In some examples, the speed determiner circuitry 318 determines the average rotational speed of the rotating component 110 based on the sum of each of the speeds per pulse determined by the waveform stability determiner circuitry 316 during the execution of block 508. In other examples, the speed determiner circuitry 318 can determine the average speed of the pulse waveform based on the number of pulses of the pulse waveform and the total duration of the signal 103.

At block 514, the threshold tester circuitry 312 determines if the average speed of the waveform is within a threshold speed range associated with the nominal speed. For example, the threshold tester circuitry 312 can determine if the output of the speed determiner circuitry 318 (e.g., the average speed, etc.) is within a speed range defined by the nominal speed (e.g., received during the execution of block 402, etc.). In some examples, if the rotating component 110 is driven by a variable frequency drive, the threshold tester circuitry 312 determines if the average speed is within a threshold range between 98% of the nominal speed and 102% of the nominal speed. In other examples, other range values are used. For example, if the rotating component 110 is driven by an induction motor, can between the synchronous speed and the service factor speed (e.g., 120% of the full load speed, etc.). In some such examples, if the threshold tester circuitry 312 determines that the average speed is not within the speed range associated with the nominal, the threshold tester circuitry 312 determines the pulse threshold candidate does not satisfy the speed testing criterion and is not suitable. If the threshold tester circuitry 312 determines that the average speed of the waveform is not within the range, the operations 500 advance to block 520. If the threshold tester circuitry 312 determines the average speed is within the range, the operations 500 advance to block 516.

At block 516, the threshold tester circuitry 312 determines if the number of pulses of the waveform is within a threshold pulse quantity range. For example, the threshold tester circuitry 312 can determine the threshold range based on the length of the sample of the signal 103 (e.g., the sample time, etc.) and the threshold speed range associated with the execution of block 514. In some such examples, the threshold tester circuitry 312 can determine if the number of pulses is within the pulse range. If the threshold tester circuitry 312 determines the number of pulses is within the threshold pulse range, the operations 500 advance to block 518. If the threshold tester circuitry 312 determines the number of pulses is not within the threshold pulse range, the operations 500 advance to block 520.

At block 518, the threshold tester circuitry 312 sets a flag that the selected candidate pulse threshold is suitable. For example, the threshold tester circuitry 312 can create a flag (e.g., an indication, a warning, data structure, etc.) in the memory 118 of FIG. 1 indicating that the current pulse threshold, as modified, has been identified by the signal processing circuitry 102 as suitable.

At block 520, the threshold tester circuitry 312 increments the test count. For example, the threshold tester circuitry 312 can increase the value of a test count (e.g., a number of times the selected pulse threshold has been tested and/or modified, etc.) by one. In other examples, the threshold tester circuitry 312 can increment the test count by another number (e.g., two, three, etc.). At block 522, the threshold tester circuitry 312 determines if the test count satisfies the count threshold (e.g., equals, exceeds, etc.). For example, the threshold tester circuitry 312 can determine the number of times the pulse threshold candidate has been modified and/or elevated by the threshold tester circuitry 312 during the execution of blocks 404-418. In some examples, the count threshold is preset by a manufacturer the signaling processing circuitry 102 and/or the test instrument 108. In some examples, the count threshold is 7. In some such examples, every seven times blocks 404-422 are executed for a selected pulse threshold candidate, the selected pulse threshold candidate is discarded, and a different pulse threshold candidate is selected (e.g., via the execution of block 502, etc.). In some examples, the count threshold is set by a user of the tachometer 104 and/or the testing instrument 108. If the threshold tester circuitry 312 determines the test count satisfies the count threshold, the operations 500 advance to block 528. If the threshold tester circuitry 312 determines the test count does not satisfy the count threshold, the operations 500 advances to block 524.

At block 524, the pulse threshold candidate generator circuitry 310 determines a pulse threshold candidate modifier. In other words, the pulse threshold candidate generator circuitry 310 can determine a modifier to apply to the pulse threshold candidate. The modifier is used to adjust the pulse threshold candidate before retesting, as disclosed in further detail herein. In some examples, the pulse threshold candidate is a fixed value based on whether the threshold is positive (e.g., 0.3, etc.) or negative (e.g., −0.3, etc.), as determined during the execution of block 412 of FIG. 4. In other examples, the pulse threshold candidate generator circuitry 310 can determine a modifier based on one or more of the signal properties of the signal 103 (e.g., a signal maxima, a signal minima, a signal median, etc.).

At block 526, the pulse threshold candidate generator circuitry 310 applies the pulse threshold modifier. For example, the pulse threshold candidate generator circuitry 310 can apply the pulse threshold modifier determined by the pulse threshold candidate generator circuitry 310 during the execution of block 526. In some examples, the pulse threshold candidate generator circuitry 310 applies the modifier additively (e.g., by adding the modifier to the pulse threshold candidate, etc.). In other examples, the pulse threshold candidate generator circuitry 310 can apply the modifier multiplicatively (e.g., by multiplying the modifier and the pulse threshold candidate, etc.). In some examples, the pulse threshold candidate generator circuitry 310 can apply the modifier to the selected pulse threshold candidate (e.g., selected during the execution of block 502, etc.). In other examples, the pulse threshold candidate generator circuitry 310 can apply the modifier to the current modified pulse threshold candidate (e.g., as previously modified during the execution of block 526, etc.).

At block 528, the threshold tester circuitry 312 determines if there are additional pulse threshold candidates to select. For example, the threshold tester circuitry 312 can determine if there are previously unselected ones of the pulse threshold candidates determined by the pulse threshold candidate generator circuitry 310 during the execution of block 412 of FIG. 4 and/or the execution of block 414 of FIG. 4. If the threshold tester circuitry 312 determines there are unselected ones of the pulse threshold candidates, the operations 500 return to block 502. If the threshold tester circuitry 312 determines there are no remaining unselected ones of the pulse threshold candidates, the operations 500 advance to block 530.

At block 530, the pulse threshold candidate generator circuitry 310 determines if other pulse threshold candidates are to be selected. For example, the pulse threshold candidate generator circuitry 310 can determine if other candidates are to be selected based on if block 532 has already been executed. In other examples, the pulse threshold candidate generator circuitry 310 can determine if other pulse threshold candidates are to be selected based on any other suitable metric. If the pulse threshold candidate generator circuitry 310 determines other pulse threshold candidates are to be selected, the operations 500 advance to block 532. If the pulse threshold candidate generator circuitry 310 determines other pulse threshold candidates are not to be selected, the operations 500 return to block 534.

At block 532, the pulse threshold candidate generator circuitry 310 sets the other pulse threshold candidates. For example, if the pulse threshold candidate generator circuitry 310 set the pulse threshold candidates as the positive pulse threshold candidates during the execution of block 416, the pulse threshold candidate generator circuitry 310 can set negative pulse threshold candidates (e.g., the negative pulse threshold candidates associated with block 414, etc.). Similarly, the pulse threshold candidate generator circuitry 310 set the pulse threshold candidates as the negative pulse threshold candidates during the execution of block 414, the pulse threshold candidate generator circuitry 310 can set positive pulse threshold candidates (e.g., the positive pulse threshold candidates associated with block 416, etc.).

At block 534, the threshold tester circuitry 312 sets a flag that no threshold has been identified. For example, the threshold tester circuitry 312 can create a flag (e.g., an indication, a warning, data structure, etc.) in the memory 118 of FIG. 1 indicating that no threshold has been identified by the signal processing circuitry 102. The operations 500 end.

FIG. 6 is a flowchart representative of example machine readable instructions and/or example operations 600 that may be executed, instantiated, and/or performed by programmable circuitry to find a suitable pulse threshold to generate a pulse waveform from a tachometer signal. The example machine-readable instructions and/or the example operations 500 of FIG. 5 may be implemented to execute block 418 of FIG. 4. The operations 600 of FIG. 6 are similar to the operations 500 of FIG. 5, except that the iteration of pulse threshold candidates and the modification is altered. The operations 600 begin at block 602, at which threshold tester circuitry 312 selects a pulse threshold candidate. For example, the threshold tester circuitry 312 can select a threshold generated by the pulse threshold candidate generator circuitry 310 during the execution of block 414 of FIG. 4 or the execution of block 416 of FIG. 4. In some examples, the threshold tester circuitry 312 can select a previously unselected one of the pulse threshold candidates (e.g., unselected during previous executions of block 602 for a current modifier, etc.). Additionally or alternatively, the threshold tester circuitry 312 can select one of the pulse threshold candidates randomly or sequentially.

At block 603, the pulse threshold candidate generator circuitry 310 applies the pulse threshold modifier to the selected pulse threshold candidate. For example, the pulse threshold candidate generator circuitry 310 can execute block 604 in a manner similar to the execution of block 526 of FIG. 5. In some examples, if there is not a pulse threshold modifier (e.g., during a first iteration of block 603, etc.), no pulse threshold modifier is applied to the selected pulse threshold candidate.

At block 604, the waveform generator circuitry 314 generates a waveform using the selected pulse threshold candidate. For example, the waveform generator circuitry 314 can execute block 604 in a manner similar to the execution of block 504 of FIG. 5. At block 606, the threshold tester circuitry 312 determines if the number of pulses of the generated waveform is greater than zero. For example, the threshold tester circuitry 312 can determine if the number of pulses is greater than zero in a manner similar to the execution of block 506 of FIG. 5. If the threshold tester circuitry 312 determines the number of pulses of the generated waveform is not greater than zero, the operations 600 advance to block 620. If the threshold tester circuitry 312 determines the number of pulses of the generated waveform is greater than zero, the operations 500 advance to block 608.

At block 608, the waveform stability determiner circuitry 316 determines the differences between adjacent pulses of the generated waveform. For example, the waveform stability determiner circuitry 316 can determine the differences between adjacent pulses of the generated waveform in a manner similar to the execution of block 508 of FIG. 5. At block 610, the threshold tester circuitry 312 determines if the waveform generated via the selected pulse candidate threshold is stable. For example, the threshold tester circuitry 312 can determine if the selected pulse candidate threshold is stable in a manner similar to the execution of block 510 of FIG. 5. If the threshold tester circuitry 312 determines the generated waveform is not stable, the operations 600 advance to block 620. If the threshold tester circuitry 312 determines the generated waveform is stable, the operations 600 advance to block 612.

At block 612, the speed determiner circuitry 318 determines the average speed of the rotating component 110 based on the generated pulse waveform. For example, the speed determiner circuitry 318 can determine the average speed in a manner similar to the execution of block 512 of FIG. 5. At block 614, the threshold tester circuitry 312 determines if the average speed of the waveform is within a threshold speed range associated with the nominal speed. For example, the threshold tester circuitry 312 determines if the average speed of the waveform is within a threshold speed range associated with the nominal speed in a manner similar to the execution of block 514 of FIG. 5. If the threshold tester circuitry 312 determines that the average speed of the waveform is not within the range, the operations 600 advance to block 620. If the threshold tester circuitry 312 determines the generated waveform is not within the range, the operations 500 advance to block 616.

At block 616, the threshold tester circuitry 312 determines if the number of pulses of the waveform is within a threshold pulse range. For example, the threshold tester circuitry 312 can determine if the number of pulses of the waveform is within a threshold pulse range in a manner similar to the execution of block 516 of FIG. 5. If the threshold tester circuitry 312 determines the number of pulses is within the threshold pulse range, the operations 600 advance to block 618. If the threshold tester circuitry 312 determines the number of pulses is not within the threshold pulse range, the operations 600 advance to block 620. At block 618, the threshold tester circuitry 312 sets a flag that the selected candidate pulse threshold is suitable. For example, the threshold tester circuitry 312 can set a flag in a manner similar to the execution of block 520 of FIG. 5.

At block 620, the threshold tester circuitry 312 determines if there are additional pulse threshold candidates to select. For example, the threshold tester circuitry 312 can determine if there are previously unselected ones of the pulse threshold candidates determined by the pulse threshold candidate generator circuitry 310 during the execution of block 412 of FIG. 4 and/or the execution of block 414 of FIG. 4. If the threshold tester circuitry 312 determines there are unselected ones of the pulse threshold candidates, the operations 600 return to block 602. If the threshold tester circuitry 312 determines there are no remaining unselected ones of the pulse threshold candidates, the operations 600 advance to block 622.

At block 622, threshold tester circuitry 312 increments the test count. increments the modification count. For example, the threshold tester circuitry 312 can increase the value of a modification count (e.g., a number of times the selected pulse threshold has been tested and/or modified, etc.) by one. In other examples, the threshold tester circuitry 312 can increment the modification count another number. At block 624, the threshold tester circuitry 312 determines if the modification count satisfies the count threshold (e.g., equals, exceeds, etc.). For example, the threshold tester circuitry 312 can determine if the modifier count exceeds the count threshold. In some examples, the count threshold is preset by a manufacturer the signaling processing circuitry 102 and/or the test instrument 108. In some examples, the count threshold is 7. In some examples, the count threshold is set by a user of the tachometer and/or the test instrument 108. If the threshold tester circuitry 312 determines the test count satisfies the count threshold, the operations 600 advances to block 626. If the threshold tester circuitry 312 determines the test count does not satisfy the count threshold, the operations 600 advances to block 628.

At block 626, the pulse threshold candidate generator circuitry 310 determines a pulse threshold candidate modifier. In other words, the pulse threshold candidate generator circuitry 310 can determine a modifier to apply to the pulse threshold candidate. In some examples, the pulse threshold candidate is a fixed value based on whether the threshold is positive (e.g., 0.3, etc.) or negative (e.g., −0.3, etc.), as determined during the execution of block 412 of FIG. 4. In other examples, the pulse threshold candidate generator circuitry 310 can determine a modifier based on one or more of the signal properties of the signal 103 (e.g., a signal maxima, a signal minima, a signal median, etc.).

At block 628, the pulse threshold candidate generator circuitry 310 determines if other pulse threshold candidates are to be selected. For example, the pulse threshold candidate generator circuitry 310 can determine if other candidates are to be selected based on if block 630 has already been executed. In other examples, the pulse threshold candidate generator circuitry 310 can determine if other pulse threshold candidates are to be selected based on any other suitable metric. If the pulse threshold candidate generator circuitry 310 determines other pulse threshold candidates are to be selected, the operations 600 advance to block 630. If the pulse threshold candidate generator circuitry 310 determines other pulse threshold candidates are not to be selected, the operations 600 advance to block 632.

At block 630, the pulse threshold candidate generator circuitry 310 sets the other pulse threshold candidates. For example, if the pulse threshold candidate generator circuitry 310 set the pulse threshold candidates as the positive pulse threshold candidates during the execution of block 416, the pulse threshold candidate generator circuitry 310 can set negative pulse threshold candidates (e.g., the negative pulse threshold candidates associated with block 414, etc.). Similarly, the pulse threshold candidate generator circuitry 310 set the pulse threshold candidates as the negative pulse threshold candidates during the execution of block 414, the pulse threshold candidate generator circuitry 310 can set positive pulse threshold candidates (e.g., the positive pulse threshold candidates associated with block 416, etc.). At block 632, the threshold tester circuitry 312 sets a flag that no threshold has been identified. For example, the threshold tester circuitry 312 can create a flag (e.g., an indication, a warning, data structure, etc.) indicating that no threshold in a manner similar to the execution of block 530 of FIG. 5.

Figure 7:
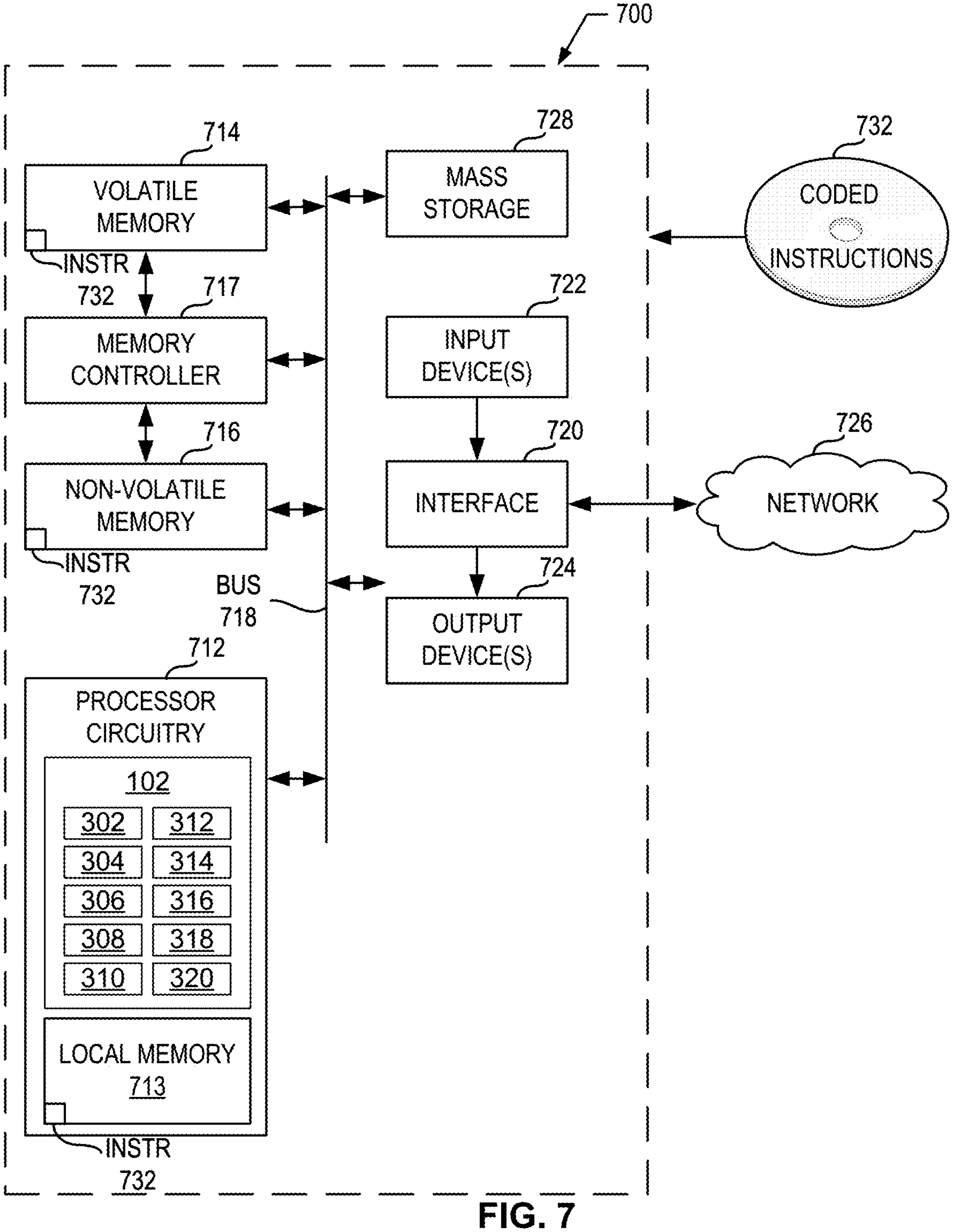
FIG. 7 is a block diagram of an example processing platform including programmable circuitry structured to execute, instantiate, and/or perform the example machine readable instructions and/or perform the example operations of FIGS. 4-6 to implement the signal processing circuitry of FIGS. 1 and 2.

FIG. 7 is a block diagram of an example programmable circuitry platform 700 structured to execute and/or instantiate the example machine-readable instructions and/or the example operations of FIGS. 4-6 to implement the signal processing circuitry 102 of FIG. 3. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements the user interface circuitry 302, the tachometer interface circuitry 304, the preprocessor circuitry 306, the signal property identifier circuitry 308, the pulse threshold candidate generator circuitry 310, the threshold tester circuitry 312, the waveform generator circuitry 314, the waveform stability determiner circuitry 316, the speed determiner circuitry 318, and the alert generator circuitry 320.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 4-6, may be stored in the mass storage device 728, in the volatile memory 714, in the non-volatile memory 716, and/or on at least one non-transitory computer readable storage medium such as a CD or DVD which may be removable.

Figure 8:
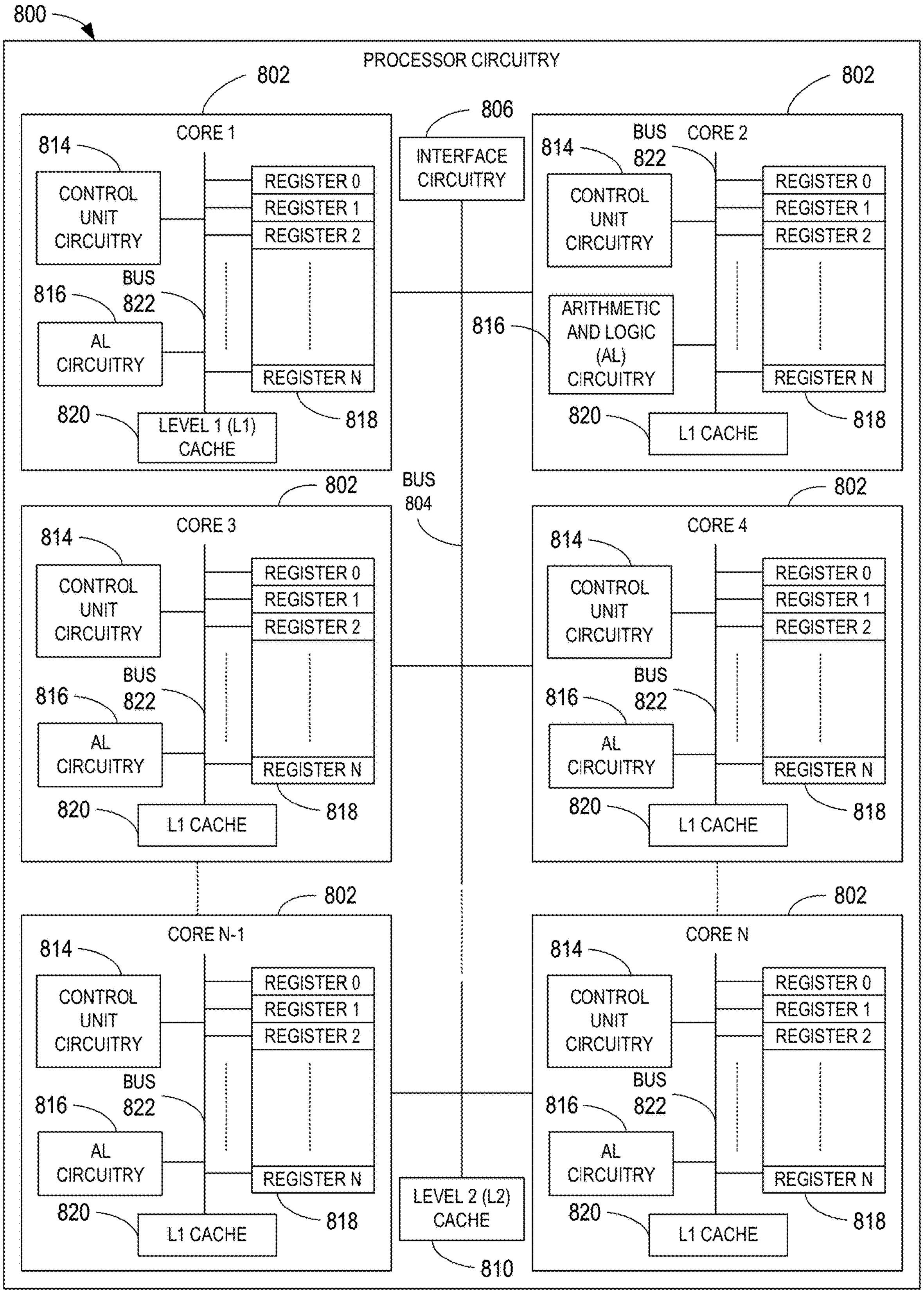
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 4-6 to effectively instantiate the circuitry of FIG. 3 as logic circuits to perform operations corresponding to those machine readable instructions. In some such examples, the circuitry of FIG. 3 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry 816 (sometimes referred to as an ALU), a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
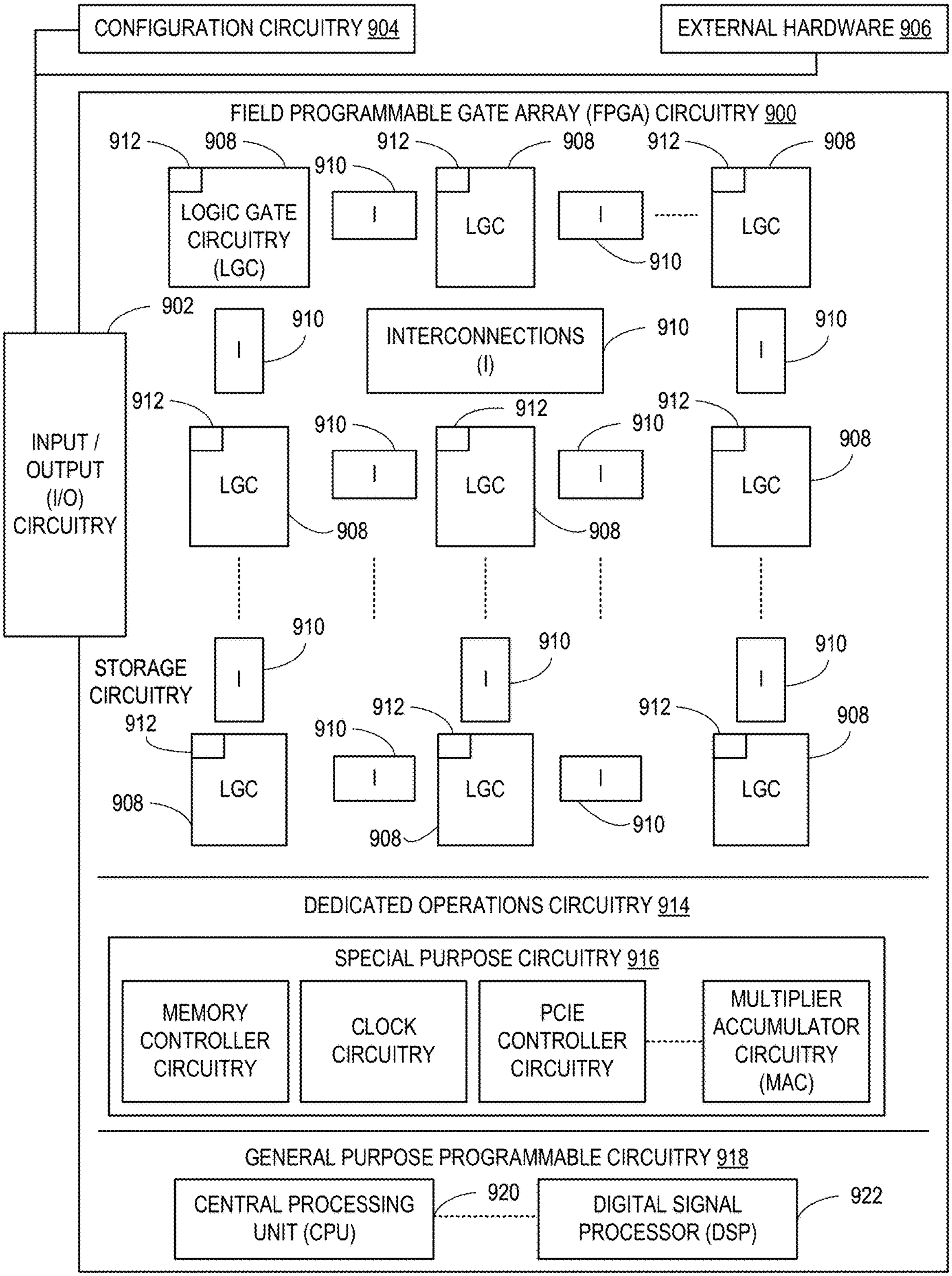
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart(s) of FIGS. 4-6 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 4-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 4-6. As such, the FPGA circuitry 900 may be configured and/or structured to effectively instantiate some or all of the operations/functions corresponding to the machine readable instructions of the flowchart(s) of FIGS. 4-6 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIGS. 4-6 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIGS. 4-6 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 4-6 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 4-6, and/or an ASIC may be configured and/or structured to perform third operation(s)/function(s) corresponding to a third portion of the machine readable instructions represented by the flowcharts of FIGS. 4-6.

It should be understood that some or all of the circuitry of FIG. 3 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 3 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

Figure 10:
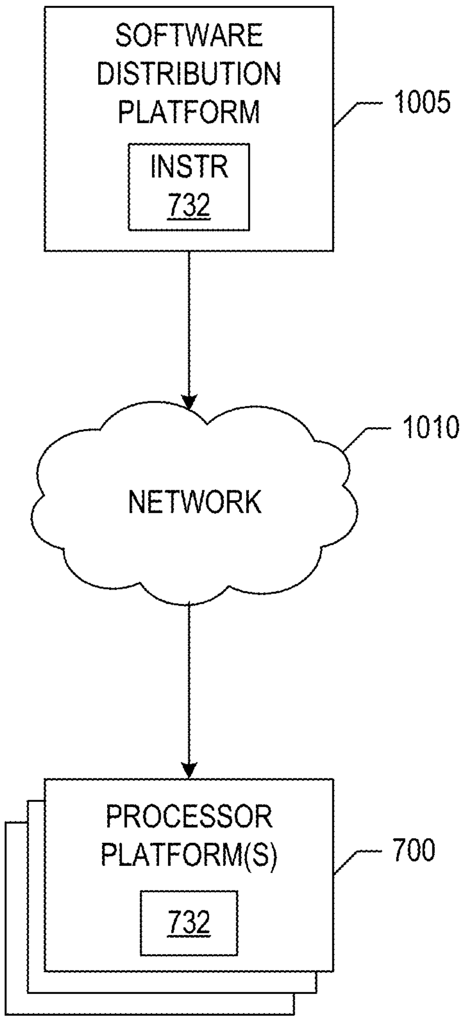
FIG. 10 is a block diagram of an example software/firmware/instructions distribution platform (e.g., one or more servers) to distribute software, instructions, and/or firmware (e.g., corresponding to the example machine readable instructions of FIGS. 3, 4, and 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 6 to other hardware devices (e.g., hardware devices owned and/or operated by third parties from the owner and/or operator of the software distribution platform) is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIGS. 4-6, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions of FIGS. 4-6, may be downloaded to the example programmable circuitry platform 700, which is to execute the machine readable instructions 732 to implement the signal processing circuitry 102 of FIGS. 1 and 2. In some examples, one or more servers of the software distribution platform 1005 periodically offer, transmit, and/or force updates to the software (e.g., the example machine readable instructions 732 of FIG. 7, etc.) to ensure improvements, patches, updates, etc., are distributed and applied to the software at the end user devices. Although referred to as software above, the distributed "software" could alternatively be firmware.

Example methods, apparatus, systems, and articles of manufacture to generate a pulse waveform from a tachometer signal are disclosed herein. Further examples and combinations thereof include the following:

Example 1 includes an apparatus comprising machine readable instructions, and programmable circuitry to at least one of instantiate or execute the machine readable instructions to access a signal output by a tachometer monitoring machinery having a rotating component, determine, based on a first property of the signal, a first pulse threshold candidate for the signal, determine whether the first pulse threshold candidate satisfies a testing criterion, generate a second pulse threshold candidate after determining the first pulse threshold candidate does not satisfy the testing criterion, the second pulse threshold candidate based on (1) a second property of the signal or (2) a modification to the first pulse threshold candidate, determine whether the second pulse threshold candidate satisfies the testing criterion, and generate a pulse waveform based on the second pulse threshold candidate after determining the second pulse threshold candidate satisfies the testing criterion.

Example 2 includes the apparatus of example 1, wherein the pulse waveform is a first pulse waveform, and the programmable circuitry is to determine whether the first pulse threshold candidate satisfies the testing criterion by generating a second pulse waveform via the first pulse threshold candidate, determining a speed based on the second pulse waveform, and comparing the speed to the testing criterion, the testing criterion including a nominal speed of the rotating component.

Example 3 includes the apparatus of example 1, wherein the pulse waveform is a first pulse waveform, and wherein the programmable circuitry is to determine whether the first pulse threshold candidate satisfies the testing criterion by generating a second pulse waveform via the first pulse threshold candidate, the second pulse waveform having a first pulse, a second pulse, and a third pulse, determining a first distance between the first pulse and the second pulse, determining a second distance between the second pulse and the third pulse, determining a ratio between the first distance and the second distance, and comparing the ratio to a stability threshold associated with the testing criterion.

Example 4 includes the apparatus of example 1, wherein the programmable circuitry is to generate the pulse waveform including a plurality of pulses with corresponding widths based on a nominal speed of the rotating component and a pulse with divisor.

Example 5 includes the apparatus of example 1, wherein the first property includes at least one of a standard deviation of the signal, an extrema of the signal, or a median of the signal.

Example 6 includes the apparatus of example 1, wherein the pulse waveform is a first pulse waveform, and wherein the programmable circuitry is to determine whether the first pulse threshold candidate satisfies the testing criterion by generating a second pulse waveform via the first pulse threshold candidate, and determining if a quantity of pulses of the second pulse waveform is greater than 0.

Example 7 includes the apparatus of example 1, further including a display, wherein the programmable circuitry is to determine a speed of the rotating component based on the pulse waveform, and output on the display at least one of the pulse waveform or the speed.

Example 8 includes a non-transitory machine readable storage medium comprising instructions to cause programmable circuitry to at least access a signal output by a tachometer monitoring machinery having a rotating component, determine, based on a first property of the signal, a first pulse threshold candidate for the signal, determine whether the first pulse threshold candidate satisfies a testing criterion, generate a second pulse threshold candidate after determining the first pulse threshold candidate does not satisfy the testing criterion, the second pulse threshold candidate based on (1) a second property of the signal or (2) a modification to the first pulse threshold candidate, determine whether the second pulse threshold candidate satisfies the testing criterion, and generate a pulse waveform based on the second pulse threshold candidate after determining the second pulse threshold candidate satisfies the testing criterion.

Example 9 includes the non-transitory machine readable storage medium of example 8, wherein the pulse waveform is a first pulse waveform, and the instructions cause the programmable circuitry to determine whether the first pulse threshold candidate satisfies the testing criterion by generating a second pulse waveform via the first pulse threshold candidate, determining a speed based on the second pulse waveform, and comparing the speed to the testing criterion, the testing criterion including a nominal speed of the rotating component.

Example 10 includes the non-transitory machine readable storage medium of example 8, wherein the pulse waveform is a first pulse waveform, and the instructions cause the programmable circuitry to determine whether the first pulse threshold candidate satisfies the testing criterion by generating a second pulse waveform via the first pulse threshold candidate, the second pulse waveform having a first pulse, a second pulse, and a third pulse, determining a first distance between the first pulse and the second pulse, determining a second distance between the second pulse and the third pulse, determining a ratio between the first distance and the second distance, and comparing the ratio to a stability threshold associated with the testing criterion.

Example 11 includes the non-transitory machine readable storage medium of example 8, wherein the instructions cause the programmable circuitry to generate the pulse waveform including a plurality of pulses with corresponding widths based on a nominal speed of the rotating component and a pulse with divisor.

Example 12 includes the non-transitory machine readable storage medium of example 8, wherein the instructions cause the programmable circuitry to determine the first pulse threshold candidate based on a least one of a standard deviation of the signal, an extrema of the signal, and/or a median of the signal.

Example 13 includes the non-transitory machine readable storage medium of example 8, wherein the pulse waveform is a first pulse waveform, and the instructions cause the programmable circuitry to determine whether the first pulse threshold candidate satisfies the testing criterion by generating a second pulse waveform via the first pulse threshold candidate, and determining if a quantity of pulses of the second pulse waveform is greater than 0.

Example 14 includes the non-transitory machine readable storage medium of example 8, wherein the instructions cause the programmable circuitry to determine a speed of the rotating component based on the pulse waveform, and output on a display at least one of the pulse waveform or the speed.

Example 15 includes a method comprising accessing a signal output by a tachometer monitoring machinery having a rotating component, determining, based on a first property of the signal, a first pulse threshold candidate for the signal, determining whether the first pulse threshold candidate satisfies a testing criterion, generating a second pulse threshold candidate after determining the first pulse threshold candidate does not satisfy the testing criterion, the second pulse threshold candidate based on (1) a second property of the signal or (2) a modification to the first pulse threshold candidate, determining whether the second pulse threshold candidate satisfies the testing criterion, and generating a pulse waveform based on the second pulse threshold candidate after determining the second pulse threshold candidate satisfies the testing criterion.

Example 16 includes the method of example 15, wherein the pulse waveform is a first pulse waveform, and the determining whether the first pulse threshold candidate satisfies the testing criterion generating a second pulse waveform via the first pulse threshold candidate, determining a speed based on the second pulse waveform, and comparing the speed to the testing criterion, the testing criterion including a nominal speed of the rotating component.

Example 17 includes the method of example 15, wherein the pulse waveform is a first pulse waveform, and the determining whether the first pulse threshold candidate satisfies the testing criterion generating a second pulse waveform via the first pulse threshold candidate, the second pulse waveform having a first pulse, a second pulse, and a third pulse, determining a first distance between the first pulse and the second pulse, determining a second distance between the second pulse and the third pulse, determining a ratio between the first distance and the second distance, and comparing the ratio to a stability threshold associated with the testing criterion.

Example 18 includes the method of example 15, wherein the pulse waveform includes a plurality of pulses with corresponding widths based on a nominal speed of the rotating component and a pulse with divisor.

Example 19 includes the method of example 15, wherein the determining the first pulse threshold candidate is based on a least one of a standard deviation of the signal, an extrema of the signal, and/or a median of the signal.

Example 20 includes the method of example 15, further including determining a speed of the rotating component based on the pulse waveform, and outputting on a display at least one of the pulse waveform or the speed.

From the foregoing, it will be appreciated that example systems, apparatus, articles of manufacture, and methods have been disclosed that enable the generation of pulse waveform and determination of speed from tachometer signal generated in the absence of a clear marker or feature on a rotating component. Disclosed systems, apparatus, articles of manufacture, and methods improve the efficiency of using a computing device and/or tachometer by facilitating the determination of the speed of rotating machinery via pulse threshold candidate finding. Disclosed systems, apparatus, articles of manufacture, and methods are accordingly directed to one or more improvement(s) in the operation of a machine such as a tachometer, a computer, other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
machine readable instructions; and
programmable circuitry to at least one of instantiate or execute the machine readable instructions to:
access a signal output by a tachometer monitoring machinery having a rotating component;
determine, based on a first property of the signal, a first pulse threshold candidate for the signal;
determine whether the first pulse threshold candidate satisfies a testing criterion by:
generating a second pulse waveform via the first pulse threshold candidate, the second pulse waveform having a first pulse, a second pulse, and a third pulse;
determining a first temporal distance between the first pulse and the second pulse;
determining a second temporal distance between the second pulse and the third pulse;
determining a ratio between the first temporal distance and the second temporal distance; and
comparing the ratio to a stability threshold associated with the testing criterion;
generate a second pulse threshold candidate after determining the first pulse threshold candidate does not satisfy the testing criterion, the second pulse threshold candidate based on (1) a second property of the signal or (2) a modification to the first pulse threshold candidate;
determine whether the second pulse threshold candidate satisfies the testing criterion; and
generate a first pulse waveform based on the second pulse threshold candidate after determining the second pulse threshold candidate satisfies the testing criterion.

2. The apparatus of claim 1, wherein the programmable circuitry is to determine whether the first pulse threshold candidate satisfies the testing criterion by:
determining a speed based on the second pulse waveform; and
comparing the speed to the testing criterion, the testing criterion including a nominal speed of the rotating component.

3. The apparatus of claim 1, wherein the programmable circuitry is to generate the first pulse waveform including a plurality of pulses with corresponding widths based on a nominal speed of the rotating component and a pulse with divisor.

4. The apparatus of claim 1, wherein the first property includes at least one of a standard deviation of the signal, an extrema of the signal, or a median of the signal.

5. The apparatus of claim 1, wherein the programmable circuitry is to determine whether the first pulse threshold candidate satisfies the testing criterion by determining if a quantity of pulses of the second pulse waveform is greater than 0.

6. The apparatus of claim 1, further including a display, wherein the programmable circuitry is to:
determine a speed of the rotating component based on the first pulse waveform; and
output on the display at least one of the first pulse waveform or the speed.

7. A non-transitory machine readable storage medium comprising instructions to cause programmable circuitry to at least:
access a signal output by a tachometer monitoring machinery having a rotating component;
determine, based on a first property of the signal, a first pulse threshold candidate for the signal;
determine whether the first pulse threshold candidate satisfies a testing criterion by:
generating a second pulse waveform via the first pulse threshold candidate, the second pulse waveform having a first pulse, a second pulse, and a third pulse;
determining a first temporal distance between the first pulse and the second pulse;
determining a second temporal distance between the second pulse and the third pulse;
determining a ratio between the first temporal distance and the second temporal distance; and
comparing the ratio to a stability threshold associated with the testing criterion;
generate a second pulse threshold candidate after determining the first pulse threshold candidate does not satisfy the testing criterion, the second pulse threshold candidate based on (1) a second property of the signal or (2) a modification to the first pulse threshold candidate;
determine whether the second pulse threshold candidate satisfies the testing criterion; and
generate a first pulse waveform based on the second pulse threshold candidate after determining the second pulse threshold candidate satisfies the testing criterion.

8. The non-transitory machine readable storage medium of claim 7, wherein the instructions cause the programmable circuitry to determine whether the first pulse threshold candidate satisfies the testing criterion by:
determining a speed based on the second pulse waveform; and
comparing the speed to the testing criterion, the testing criterion including a nominal speed of the rotating component.

9. The non-transitory machine readable storage medium of claim 7, the instructions cause the programmable circuitry to generate the first pulse waveform including a plurality of pulses with corresponding widths based on a nominal speed of the rotating component and a pulse with divisor.

10. The non-transitory machine readable storage medium of claim 7, wherein the instructions cause the programmable circuitry to determine the first pulse threshold candidate based on at least one of a standard deviation of the signal, an extrema of the signal, and/or a median of the signal.

11. The non-transitory machine readable storage medium of claim 7, wherein the instructions cause the programmable circuitry to determine whether the first pulse threshold candidate satisfies the testing criterion by determining if a quantity of pulses of the second pulse waveform is greater than 0.

12. The non-transitory machine readable storage medium of claim 7, wherein the instructions cause the programmable circuitry to:
determine a speed of the rotating component based on the first pulse waveform; and
output on a display at least one of the first pulse waveform or the speed.

13. A method comprising:
accessing a signal output by a tachometer monitoring machinery having a rotating component;

determining, based on a first property of the signal, a first pulse threshold candidate for the signal;

determining whether the first pulse threshold candidate satisfies a testing criterion by:

generating a second pulse waveform via the first pulse threshold candidate, the second pulse waveform having a first pulse, a second pulse, and a third pulse;

determining a first temporal distance between the first pulse and the second pulse;

determining a second temporal distance between the second pulse and the third pulse;

determining a ratio between the first temporal distance and the second temporal distance; and comparing the ratio to a stability threshold associated with the testing criterion;

generating a second pulse threshold candidate after determining the first pulse threshold candidate does not satisfy the testing criterion, the second pulse threshold candidate based on (1) a second property of the signal or (2) a modification to the first pulse threshold candidate;

determining whether the second pulse threshold candidate satisfies the testing criterion; and generating a first pulse waveform based on the second pulse threshold candidate after determining the second pulse threshold candidate satisfies the testing criterion.

14. The method of claim 13, wherein the determining whether the first pulse threshold candidate satisfies the testing criterion includes:

determining a speed based on the second pulse waveform; and comparing the speed to the testing criterion, the testing criterion including a nominal speed of the rotating component.

15. The method of claim 13, wherein the first pulse waveform includes a plurality of pulses with corresponding widths based on a nominal speed of the rotating component and a pulse with divisor.

16. The method of claim 13, wherein the determining the first pulse threshold candidate is based on at least one of a standard deviation of the signal, an extrema of the signal, and/or a median of the signal.

17. The method of claim 13, further including:

determining a speed of the rotating component based on the first pulse waveform; and outputting on a display at least one of the first pulse waveform or the speed.

* * * * *